US012755084B1

(12) United States Patent
Dryer et al.

(10) Patent No.: US 12,755,084 B1
(45) Date of Patent: Oct. 6, 2026

(54) PRESENTING A VISUAL REPRESENTATION OF AUDIBLE SIGNAL DATA BASED ON ENVIRONMENT APPEARANCE

(71) Applicant: Apple Inc., Cupertino, CA (US)

(72) Inventors: Allison W. Dryer, Tiburon, CA (US); Brian W. Temple, Santa Clara, CA (US); Ioana Negoita, San Jose, CA (US)

(73) Assignee: Apple Inc., Cupertino, CA (US)

( * ) Notice: Subject to any disclaimer, the term of this patent is extended or adjusted under 35 U.S.C. 154(b) by 289 days.

(21) Appl. No.: 18/367,201

(22) Filed: Sep. 12, 2023

Related U.S. Application Data

(60) Provisional application No. 63/409,289, filed on Sep. 23, 2022.

(51) Int. Cl.
*G06F 40/109* (2020.01)
*G06F 16/3329* (2025.01)
*G06F 40/56* (2020.01)
*G10L 13/08* (2013.01)

(52) U.S. Cl.
CPC ........ *G06F 40/109* (2020.01); *G06F 16/3329* (2019.01); *G06F 40/56* (2020.01); *G10L 13/08* (2013.01)

(58) Field of Classification Search
CPC ..... G10L 13/08; G06F 16/3329; G06F 40/56; G06F 40/109
See application file for complete search history.

(56) References Cited

U.S. PATENT DOCUMENTS

| | | | | |
|---|---|---|---|---|
| 9,990,916 B2 * | 6/2018 | Vanreusel | G06F 40/30 | |
| 10,299,008 B1 * | 5/2019 | Catalano | G06F 18/22 | |
| 10,606,814 B2 * | 3/2020 | Mital | G06F 16/211 | |
| 2014/0337023 A1 * | 11/2014 | McCulloch | G06F 3/011 | 704/235 |
| 2017/0039190 A1 * | 2/2017 | Ricardo | G06F 40/58 | |
| 2020/0374253 A1 * | 11/2020 | Linguanti | G07C 11/00 | |
| 2021/0201905 A1 * | 7/2021 | Viedt | G10L 15/30 | |
| 2021/0319780 A1 * | 10/2021 | Aher | G10L 13/0335 | |

OTHER PUBLICATIONS

Bansal K., "Bouncing Dots Loader in React J", Jan. 30, 2022, DEV Community, https://web.archive.org/web/20230610115118/ https://dev.to/kirteshbansal/bouncing-dots-loader-in-react-4jng (Year: 2022).*

* cited by examiner

*Primary Examiner* — Jitesh Patel
(74) *Attorney, Agent, or Firm* — Fernando & Partners, LLP

(57) ABSTRACT

A method includes obtaining, via an audio sensor, audible signal data representing an utterance uttered in a physical environment of a device. The method includes generating a text representation of the audible signal data. The method includes displaying, on a display, within a messaging interface, the text representation as a message with a visual characteristic that is based on a visual appearance of a portion of the physical environment.

17 Claims, 16 Drawing Sheets

300

PRESENTING A VISUAL REPRESENTATION OF AUDIBLE SIGNAL DATA BASED ON ENVIRONMENT APPEARANCE

CROSS-REFERENCE TO RELATED APPLICATION

This application claims the benefit of U.S. Provisional Patent App. No. 63/409,289, filed on Sep. 23, 2022, which is incorporated by reference in its entirety.

TECHNICAL FIELD

The present disclosure generally relates to presenting a visual representation of audible signal data based on environment appearance.

BACKGROUND

Some devices include a microphone that detects speech and a display that presents content. A device may detect speech via the microphone and display a text representation of the speech. The device may utilize a speech-to-text converter to generate the text representation of the speech. Text that represents speech can sometimes be difficult to follow thereby detracting from a user experience of the device.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
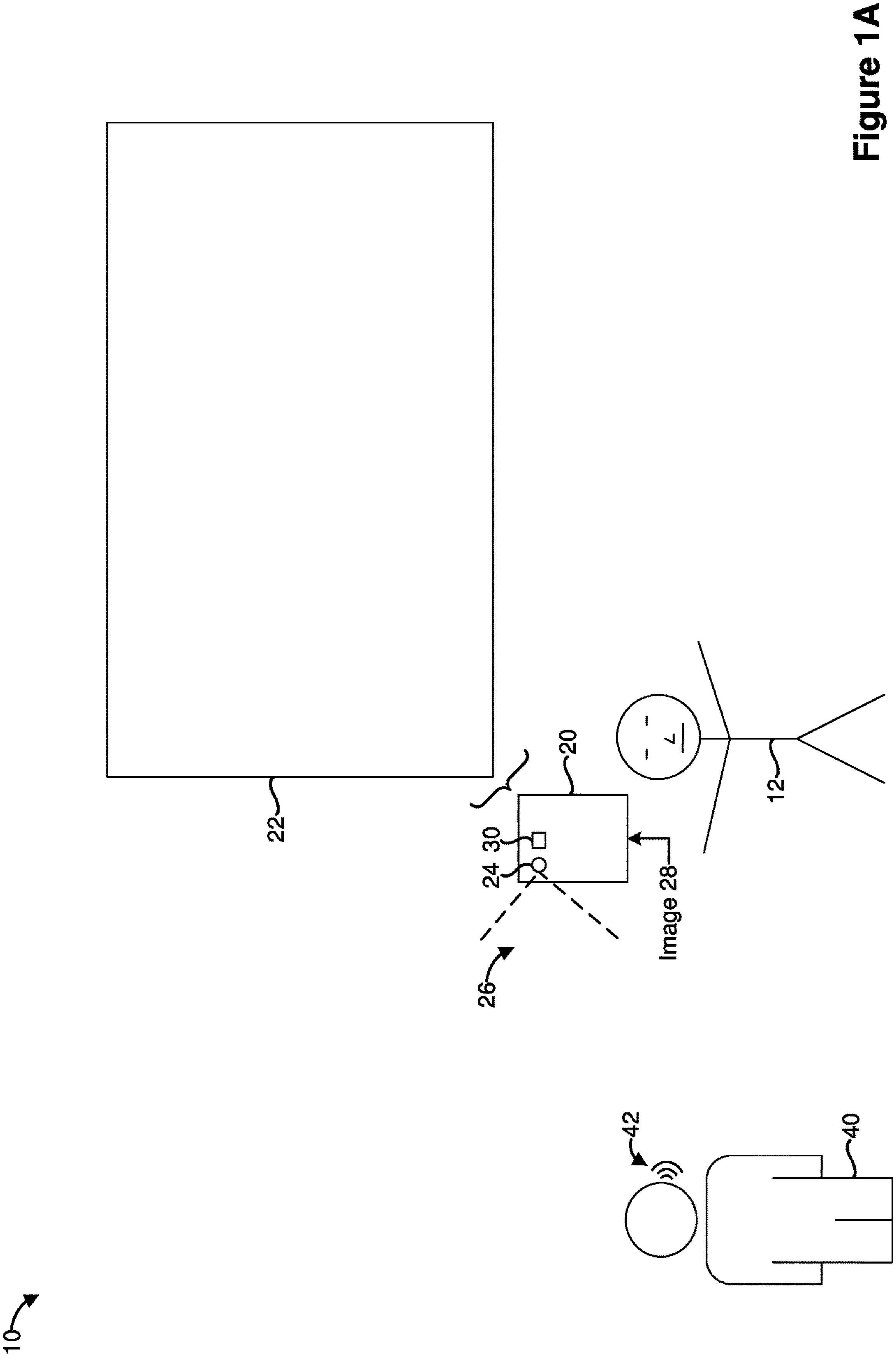
FIGS. 1A-1M are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for presenting a visual representation of audible signal data based on a visual appearance of a physical environment of a device. In some implementations, a method is performed by a device including an audio sensor, a display, one or more processors, and a non-transitory memory. In various implementations, a method includes obtaining, via the audio sensor, audible signal data representing an utterance uttered in a physical environment of the device. In some implementations, the method includes generating a text representation of the audible signal data. In some implementations, the method includes displaying, on the display, within a messaging interface, the text representation as a message with a visual characteristic that is based on a visual appearance of a portion of the physical environment.

In accordance with some implementations, a device includes one or more processors, a plurality of sensors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

When a person is in a physical environment where speech is being uttered, the person may need to refer back to previously uttered speech. For example, if the person is at a train station where announcements are being made, the person may want to refer to a previous announcement for information such as on which platform a particular train is arriving. Moreover, if there are multiple sources of speech, it may be difficult for a person to differentiate between the speech from each of the sources.

The present disclosure provides methods, systems, and/or devices for displaying a text representation of speech as a message with a visual characteristic that is based on a visual appearance of a portion of the physical environment. A device detects the speech and utilizes a speech-to-text converter to generate the text representation of the speech. The device displays the text representation of the speech as a message within a messaging interface of a messaging application. The message can persist in the messaging application as additional speech is detected. As such, the user can scroll through the messages to see previously detected speech. For example, the user can scroll through the messages to view a previous announcement that the user wants to refer to.

The device can set a visual characteristic of the message based on a visual appearance of a portion of the physical environment. As an example, a background color of the message can be set to a color of an article of clothing that a person that uttered the speech is wearing. As another example, a font color of the message can be set to a dominant color of the physical environment (e.g., to a color of walls in the physical environment). If there are multiple sources of speech, the device can display messages corresponding to each of the sources with a different visual characteristic. For example, the device can display a first set of messages that include text representations of speech being uttered by a first person with a first color that matches a color of a shirt that the first person is wearing, and the device can display a second set of messages that include text representations of speech being uttered by a second person with a second color that matches a color of a dress that the second person is wearing. In this example, the user can easily identify which messages represent a transcript of each person based on the color of the messages.

The device can change a visual characteristic of a text representation of previously detected speech so that the text representation of the previously detected speech appears different from a text representation of currently detected speech. As an example, the device can reduce an opacity of text representations of previously detected speech. For example, the device can display the most recent text representation at one hundred percent opacity, the second most recent text representation at eighty percent opacity, etc.

The device can detect a user input directed to a message that displays the text representation of detected speech. Upon detecting the user input, the device can display a menu with various options such as a forward option for forwarding the message to another device, a translate option for translating the message into another language, a quick response option to generate a set of suggested responses to the speech, etc. The device can display a suggested response for the user to speak or to show to another person. If the device detects that the device has been rotated to face another person (e.g., the speaker), the device can increase the text size so that the speaking person can view the selected suggested response. Alternatively, the suggested response can be output as an audible signal.

If the detected speech is in a language that is different from a language associated with the device or the user of the device, the device can translate the speech and display the translation. The device may be associated with a default language (e.g., English). If the detected speech is in a different language (e.g., Italian), the device may display a translation of the detected speech. The device can display a text representation of the detected speech in a language of the detected speech and another text representation that corresponds to a translation of the detected speech into another language. For example, in response to detecting speech in Italian, the device may display a text representation (e.g., a transcript) of the detected speech in Italian and another text representation of the detected speech in a translated language (e.g., in English).

FIG. 1A is a diagram that illustrates an example physical environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the physical environment 10 includes an electronic device 20, a user 12 of the electronic device 20 and a person 40. In some implementations, the electronic device 20 includes a handheld computing device that can be held by the user 12. For example, the electronic device 20 may include a smartphone, a tablet, a media player, a laptop or the like that can be held by the user 12. Alternatively, in some implementations, the electronic device 20 includes a wearable computing device that can be worn by the user 12. For example, the electronic device 20 may include an HMD or an electronic watch that can be worn by the user 12.

In various implementations, the electronic device 20 includes a display 22, an image sensor 24 (e.g., a camera) and an audio sensor 30 (e.g., a microphone). The image sensor 24 is associated with a field of view 26. The image sensor 24 captures an image 28 that includes pixels corresponding to objects that are in the field of view 26 of the image sensor 24. In the example of FIG. 1A, the person 40 is in the field of view 26 of the image sensor 24. As such, the image 28 includes pixels that correspond to the person 40. In other implementations, the electronic device 20 does not display the image 28 and instead provides an optical see-through of the physical environment 10 including the person 40. The audio sensor 30 receives an audible signal 42 that corresponds to an utterance being uttered by the person 40. The audio sensor 30 converts the audible signal 42 into audible signal data (e.g., electronic signal data).

In some implementations, the audible signal 42 represents speech that the person 40 is speaking. In some implementations, the electronic device 20 and/or the user 12 are associated with a first language (e.g., a default language), and the person 40 is speaking in the first language. Alternatively, in some implementations, the person 40 is speaking in a second language that is different from the first language. In such implementations, the electronic device 20 translates the speech from the second language to the first language, so that the user 12 can understand what the person 40 is speaking.

Figure 1B:
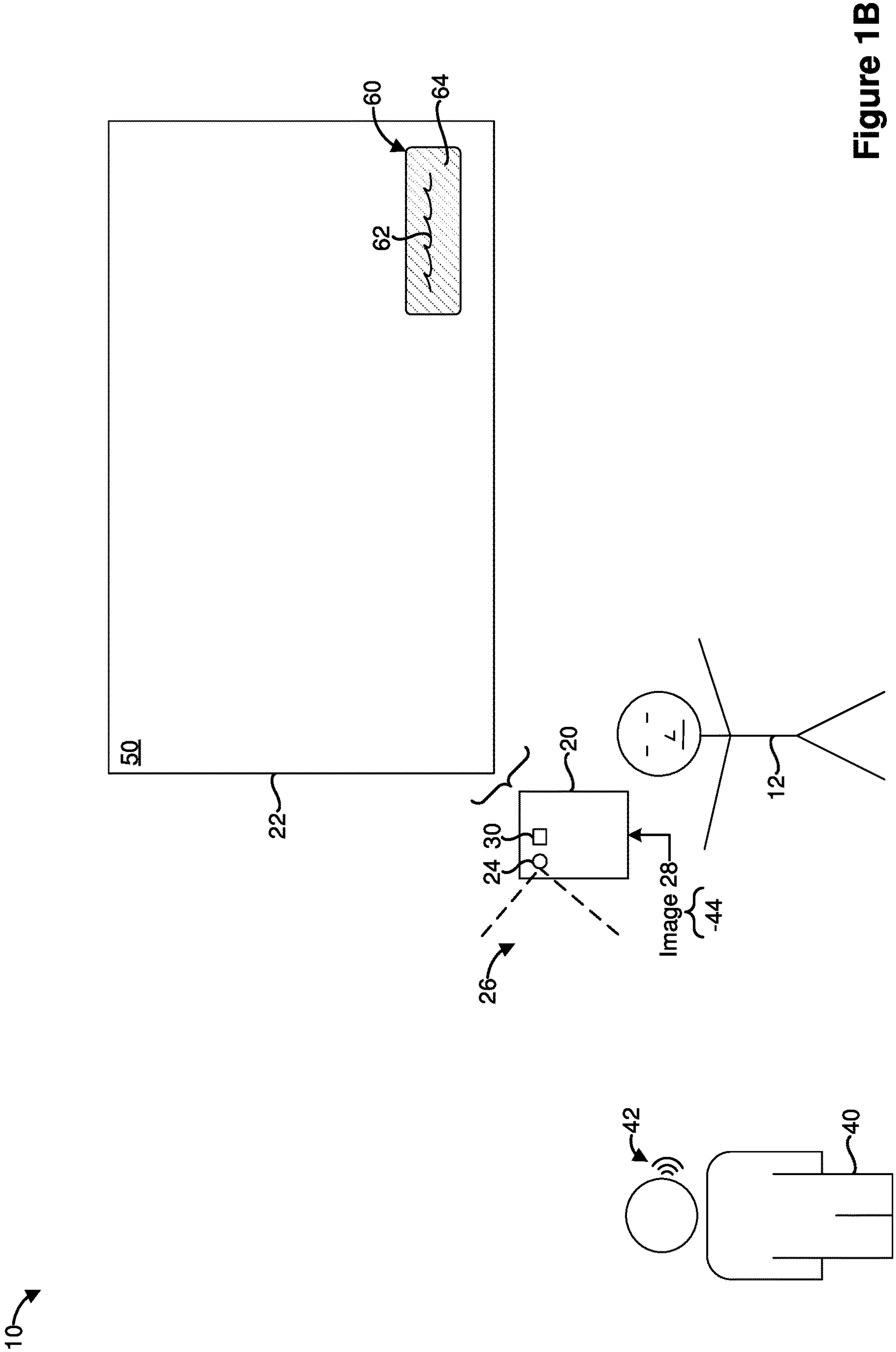

Referring to FIG. 1B, the electronic device 20 displays a messaging interface 50 on the display 22. In some implementations, the messaging interface 50 is generated by a messaging application that is installed on the electronic device 20. In the example of FIG. 1B, the messaging interface 50 includes a first message 60 that includes a first text representation 62 of the audible signal 42. In some implementations, the electronic device 20 includes a speech-to-text converter that generates the first text representation 62 by performing a speech-to-text operation on the audible signal data that represents the audible signal 42. In some implementations, the electronic device 20 generates the first text representation 62 by further performing a translation operation (e.g., when the audible signal 42 includes phrases that are in a different language than a language associated with the electronic device 20).

In some implementations, the first message 60 is displayed in the form of a message bubble that encompasses (e.g., encloses or surrounds) the first text representation 62. In some implementations, the first message 60 has a rectangular shape with rounded corners. In some implementations, the first message 60 is associated with metadata that can be viewed by selecting the first message 60 (e.g., by tapping the first message 60 or via a long press). The metadata may include a time at which the first message 60 was first displayed (e.g., a time at which the audible signal 42 was detected) and/or a location where the first message 60 was first displayed (e.g., a location where the audible signal 42 was detected).

In various implementations, the electronic device 20 displays the first message 60 with a first visual characteristic 64. In some implementations, the electronic device 20 determines a visual appearance 44 of a portion of the physical environment 10. In the example of FIG. 1A, the visual appearance 44 indicates a visual appearance of the person 40 that is uttering the speech represented by the audible signal 42. More generally, in some implementations, the electronic device 20 identifies a portion of the physical environment 10 where an audible signal is originating from, and the electronic device 20 determines a visual appearance of the portion of the physical environment 10 where the audible signal is originating from. For example, the electronic device 20 may identify the portion of the physical environment 10 where the audible signal is originating from based on a directionality of the audible signal (e.g., based on a direction of arrival of the audible signal). Additionally or alternatively, the electronic device 20 may identify the portion of the physical environment 10 where the audible signal is originating from based on a computer vision analysis of the image 28 (e.g., by performing instance segmentation and/or semantic segmentation on the image 28 in order to identify a sound-generating element). In various implementations, the first visual characteristic 64 is based on (e.g., a function of) the visual appearance 44.

In some implementations, the visual appearance 44 indicates a color associated with the person 40, and the first visual characteristic 64 includes a color that matches (e.g., is similar to or is the same as) the color associated with the person 40. In some implementations, the visual appearance 44 indicates a color of an article of clothing that the person 40 is wearing (e.g., a color of a shirt, a dress or an outfit that the person 40 is wearing). In some implementations, the visual appearance 44 indicates a color of an accessory that the person 40 is wearing or carrying (e.g., a color of a hat, a purse, a handbag, a brief case, a backpack, a carry-on baggage, etc.). In some implementations, the visual appearance 44 indicates a color of the person 40. In some implementations, the first visual characteristic 64 includes a background color of the first message 60. In some implementations, the first visual characteristic 64 includes a font color of the first text representation 62.

In some implementations, the visual appearance 44 indicates a size of the person 40, and the first visual characteristic 64 includes a size of the first message 60. For example, in some implementations, the visual appearance 44 indicates a height of the person 40. In some implementations, the visual appearance 44 indicates whether the person 40 is an adult or a child. In some implementations, the electronic device 20 sets the size of the first message 60 based on the size of the person 40. For example, the electronic device 20 utilizes a relatively large message bubble when the size of the person 40 is greater than a threshold size (e.g., when the person 40 is an adult) and a relatively small message bubble when the size of the person 40 is less than the threshold size (e.g., when the person 40 is a child). In some implementations, the size of the first message 60 includes a font size of the first text representation 62. For example, the electronic device 20 displays the first text representation 62 with a first font size when the person 40 is taller than a threshold height and the electronic device 20 displays the first text representation 62 with a second font size that is smaller than the first font size when the person 40 is shorter than the threshold height.

Figure 1C:
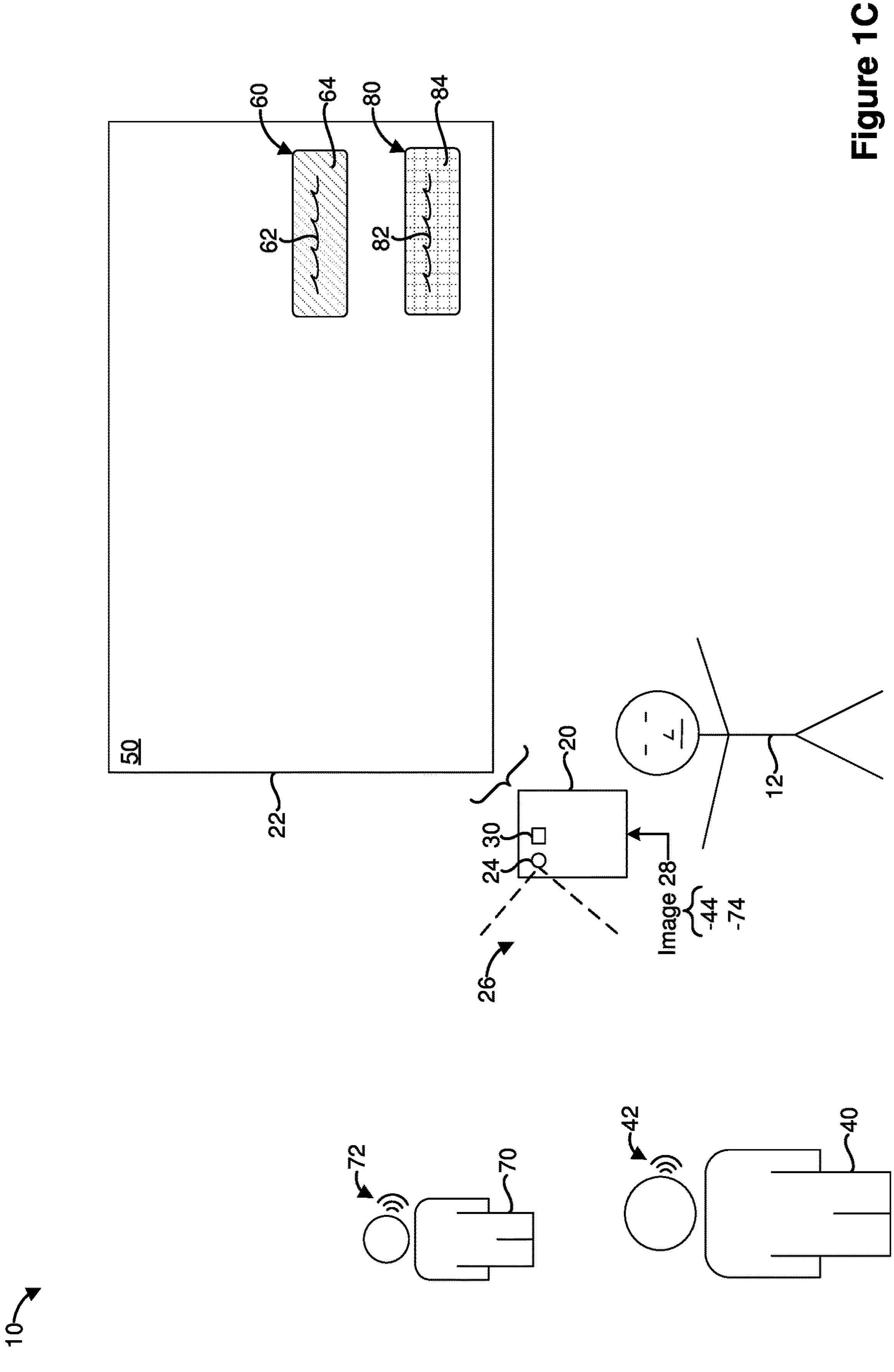

Referring to FIG. 1C, in some implementations, the physical environment 10 includes multiple sources of speech and the electronic device 20 displays respective text representations of speech from the sources with different visual characteristics in order to allow the user 12 to distinguish between text representations from different sources. In the example of FIG. 1C, the physical environment 10 includes another person 70 that is uttering speech represented by an audible signal 72. The audio sensor 30 receives the audible signal 72 and converts the audible signal into audible signal data.

As shown in FIG. 1C, the electronic device 20 displays a second message 80 that includes a second text representation 82 of the speech represented by the audible signal 72. The electronic device 20 displays the second message 80 with a second visual characteristic 84 that is based on a visual appearance 74 of the person 70. As illustrated in FIG. 1C, the second visual characteristic 84 is different from the first visual characteristic 64, for example, because the visual appearance 74 of the person 70 is different from the visual appearance 44 of the person 40. In the example of FIG. 1C, the first visual characteristic 64 is indicated by upward diagonal lines and the second visual characteristic 84 is indicated by horizontal and vertical grid lines.

In some implementations, the visual appearance 74 of the person 70 indicates a color associated with the person 70, and the second visual characteristic 84 includes a color of the second message 80. For example, the visual appearance 74 may indicate a color of an article of clothing that the person 70 is wearing, a color of an accessory that the person 70 is carrying or a color of a skin of the person 70, and the second visual characteristic 84 may include a background color of the second message 80 and/or a font color of the second text representation 82.

In some implementations, the visual appearance 74 of the person 70 indicates a size of the person 70, and the second visual characteristic 84 includes a size of the second message 80. For example, the visual appearance 74 may indicate that the person 70 is a child, and the second visual characteristic 84 includes a size of the message bubble that encloses the second text representation 82. In some implementations, the second visual characteristic 84 includes a font of the second text representation 82. For example, the electronic device 20 may select a font that is similar to how a child writes in response to the visual appearance 74 indicating that the person 70 is a child. As an example, the electronic device 20 can display the second text representation 82 in order to provide an appearance that the second text representation 82 was hand-written (e.g., scribbled) by crayons.

In various implementations, displaying the first message 60 and the second message 80 with different visual characteristics allows the user 12 to easily associate the messages 60 and 80 with their correct sources. For example, displaying the first message 60 with the first visual characteristic 64 serves as a visual indication that the first message 60 corresponds to speech spoken by the person 40. Similarly, displaying the second message 80 with the second visual characteristic 84 serves as a visual indication that the second message 80 corresponds to speech spoken by the person 70. Utilizing different visual characteristics to displaying text representations of speech uttered by different persons helps in associating the text representations with the correct persons when names of the persons are not known and the text representations cannot be labeled with the names of the persons.

Figure 1D:
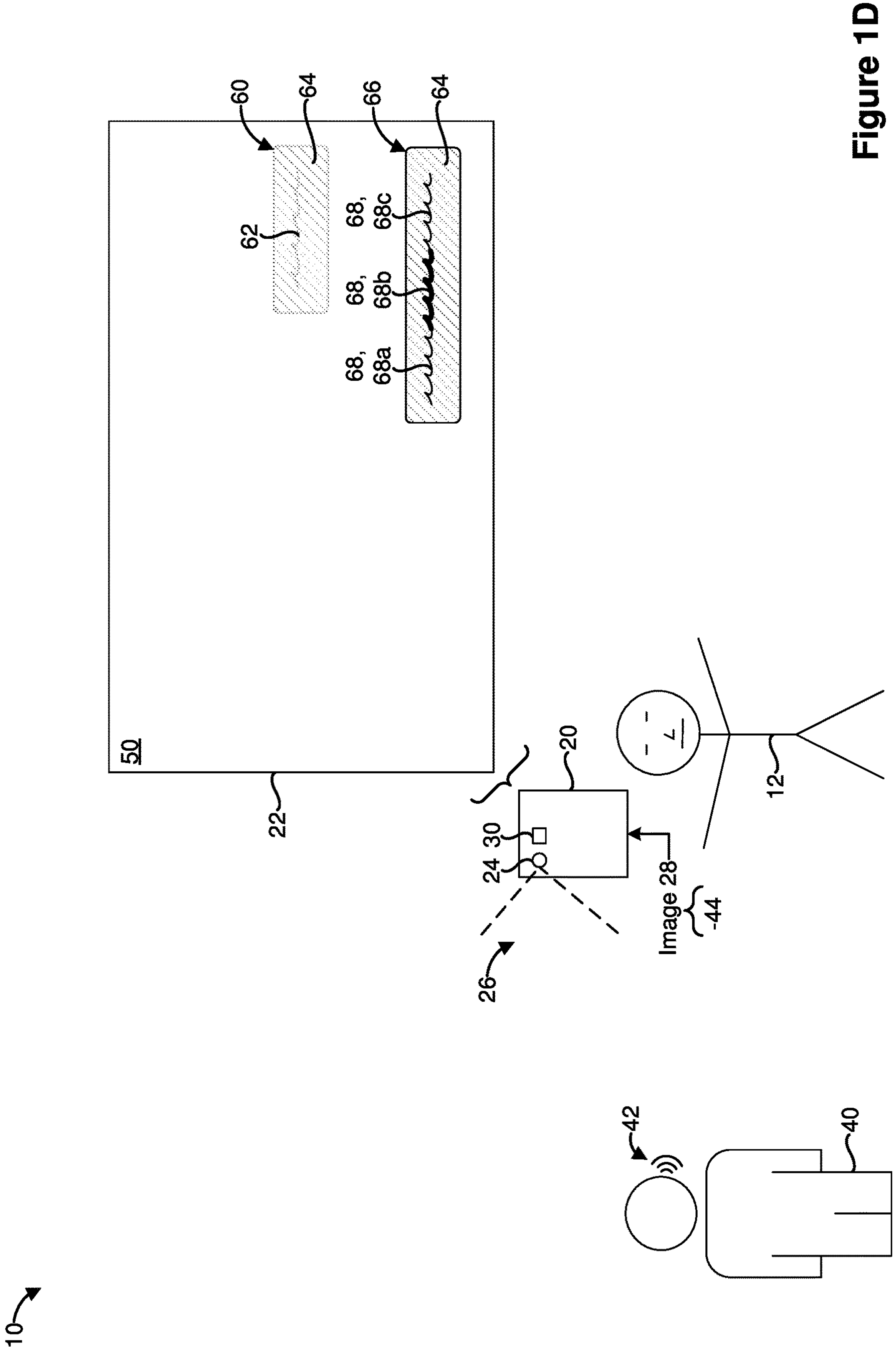

Referring to FIG. 1D, in some implementations, the electronic device 20 updates a portion of a text representation of speech after detecting additional speech. For example, as the person 40 speaks, the electronic device 20 may generate a text representation of a first phrase and the electronic device 20 can update the text representation of the first phrase upon detecting a second phrase that the person 40 spoke after speaking the first phrase. When the electronic device 20 updates the text representation of the first phrase, the electronic device 20 can indicate the update to the text representation of the first phrase by displaying the text representation of the first phrase with a different visual characteristic. FIG. 1D illustrates a message 66 that includes a text representation 68 with a first portion 68*a*, a second portion 68*b* and a third portion 68*c*. In the example of FIG. 1D, the electronic device 20 updates the second portion 68*b* of the text representation 68 after displaying the second portion 68*b*. In order to indicate the update to the second portion 68*b*, the electronic device 20 can display the second portion 68*b* with a different visual characteristic than the first visual characteristic 64. For example, the electronic device 20 can display the second portion 68*b* in bold after updating the second portion 68*b* (as indicated by a greater thickness of the squiggly line representing the second portion 68*b*). After displaying the second portion 68*b* with a different visual characteristic for an amount of time, the electronic device 20 can revert to displaying the second portion 68*b* with the same visual characteristic as the first portion 68*a* and the third portion 68*c* (e.g., revert to displaying the second portion 68*b* with the first visual characteristic 64). Displaying updated portions of the text representation with a different visual characteristic attracts an attention of the user 12 to the updated portion. Alternatively, the electronic device 20 can update a portion of a previously displayed text representation without changing the visual characteristic of the previously displayed text representation (e.g., without the added visual prominence or animation).

In some implementations, the electronic device 20 animates a text representation of newly obtained audible signal data by displaying the text representation with an increased opacity. In some implementations, the electronic device 20 indicates an update to an existing text representation by displaying the updated portion with an increased opacity. For example, when the electronic device 20 is displaying a translated transcript of audible signal data, the electronic device 20 may identify a new word that affects a sentence structure or a meaning of a previously translated and displayed word, and display the new word with an increased opacity. In some implementations, the electronic device 20 displays text representations such that each message bubble corresponds to a single utterance. In such implementations, once a message bubble is completed, the electronic device 20 starts creating a new message bubble and the electronic device 20 does not makes changes to previously displayed message bubbles.

Figure 1E:
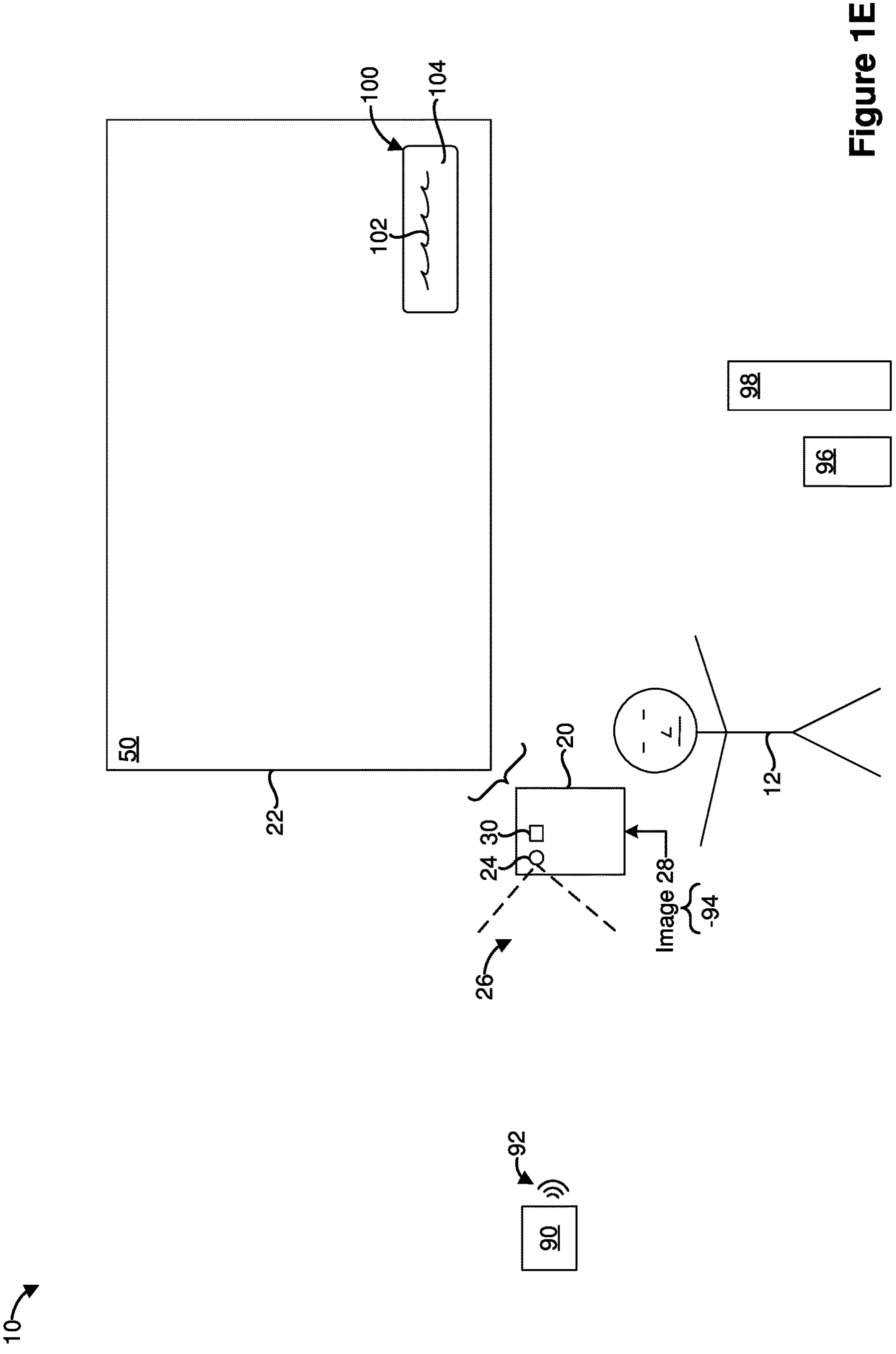

Referring to FIG. 1E, in some implementations, the source of an audible signal is a device instead of a person. In the example of FIG. 1E, the physical environment 10 includes a device 90 that generates an audible signal 92. The audio sensor 30 receives the audible signal 92 and converts the audible signal 92 to audible signal data. The electronic device 20 displays a message element 100 ("message 100" hereafter) that includes a text representation 102 of the audible signal data. The electronic device 20 determines a visual appearance 94 of a portion of the physical environment 10 that includes the device 90, and the electronic device 20 displays the message 100 with a visual characteristic 104 that is based on the visual appearance 94. In some implementations, the visual appearance 94 includes a visual appearance of the device 90 (e.g., a color of the device 90, a size of the device 90, a type of the device, etc.).

Figure 1F:
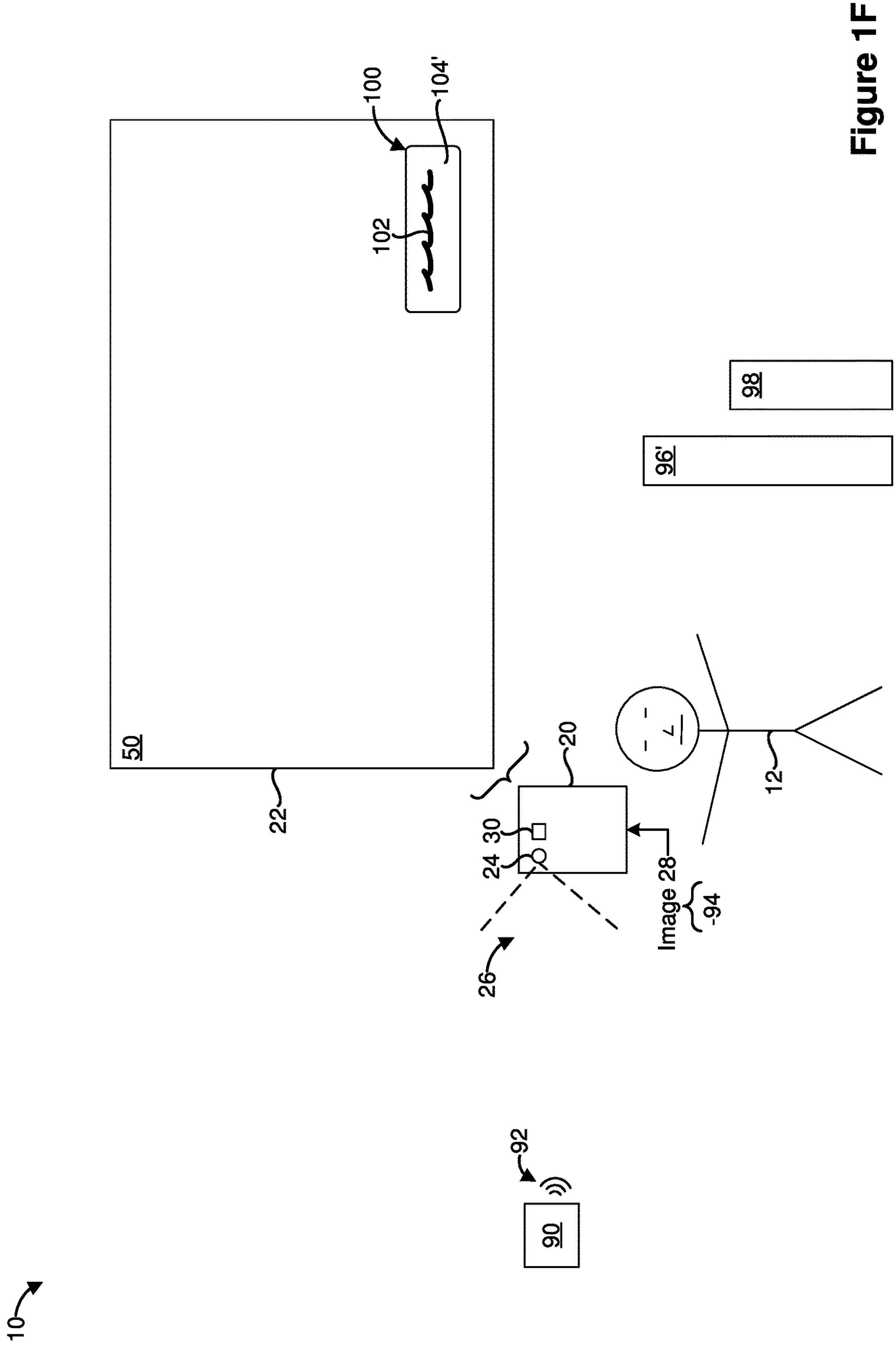

In some implementations, the electronic device 20 determines the visual characteristic 104 of the message 100 based on an audio characteristic of the audible signal data (e.g., based on an amplitude and/or a frequency associated with the audible signal data). In the example of FIG. 1E, the electronic device 20 determines that the audible signal data is associated with an amplitude 96 that is below a threshold amplitude 98. The visual characteristic 104 may include a font size or a font type that the electronic device 20 selects in response to the amplitude 96 being lower than the threshold amplitude 98. For example, the electronic device 20 may determine to display the text representation 102 with a regular font weight when the amplitude 96 is lower than the threshold amplitude 98. By contrast, in the example of FIG. 1F, the electronic device 20 determines that the audible signal data is associated with an amplitude 96' that is greater than the threshold amplitude 98. In response to the amplitude 96' being greater than the threshold amplitude 98, the electronic device 20 displays the text representation 102 with a visual characteristic 104' that is different from the visual characteristic 104 shown in FIG. 1E. For example, the electronic device 20 may display the text representation 102 with a bold font weight instead of a regular font weight (e.g., the squiggle representing the text representation 102 in FIG. 1F is thicker than the squiggle representing the text representation 102 in FIG. 1E).

Referring to FIG. 1G-1J, in some implementations, the electronic device 20 allows the user 12 to interact with the first message 60 in the same manner as a message that the electronic device 20 receives or sends electronically via a transceiver. For example, the electronic device 20 provides the user 12 with options to forward, translate and/or generate suggested responses to the first text representation 62 in the same manner the electronic device 20 provides the user 12 with options to forward, translate and/or generate suggested responses to messages that the electronic device 20 receives or transmits via the transceiver.

Figure 1G:
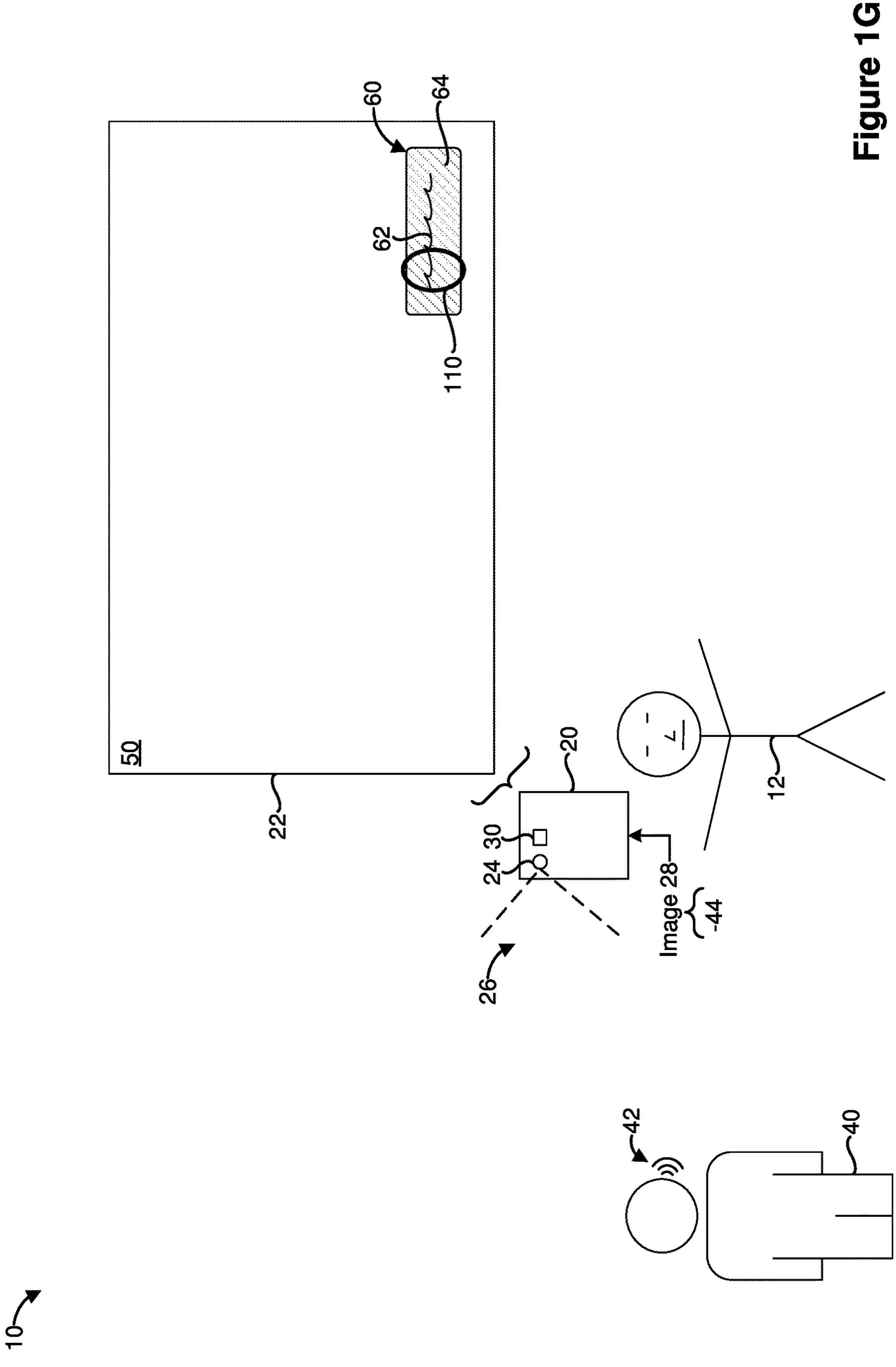
Figure 1H:
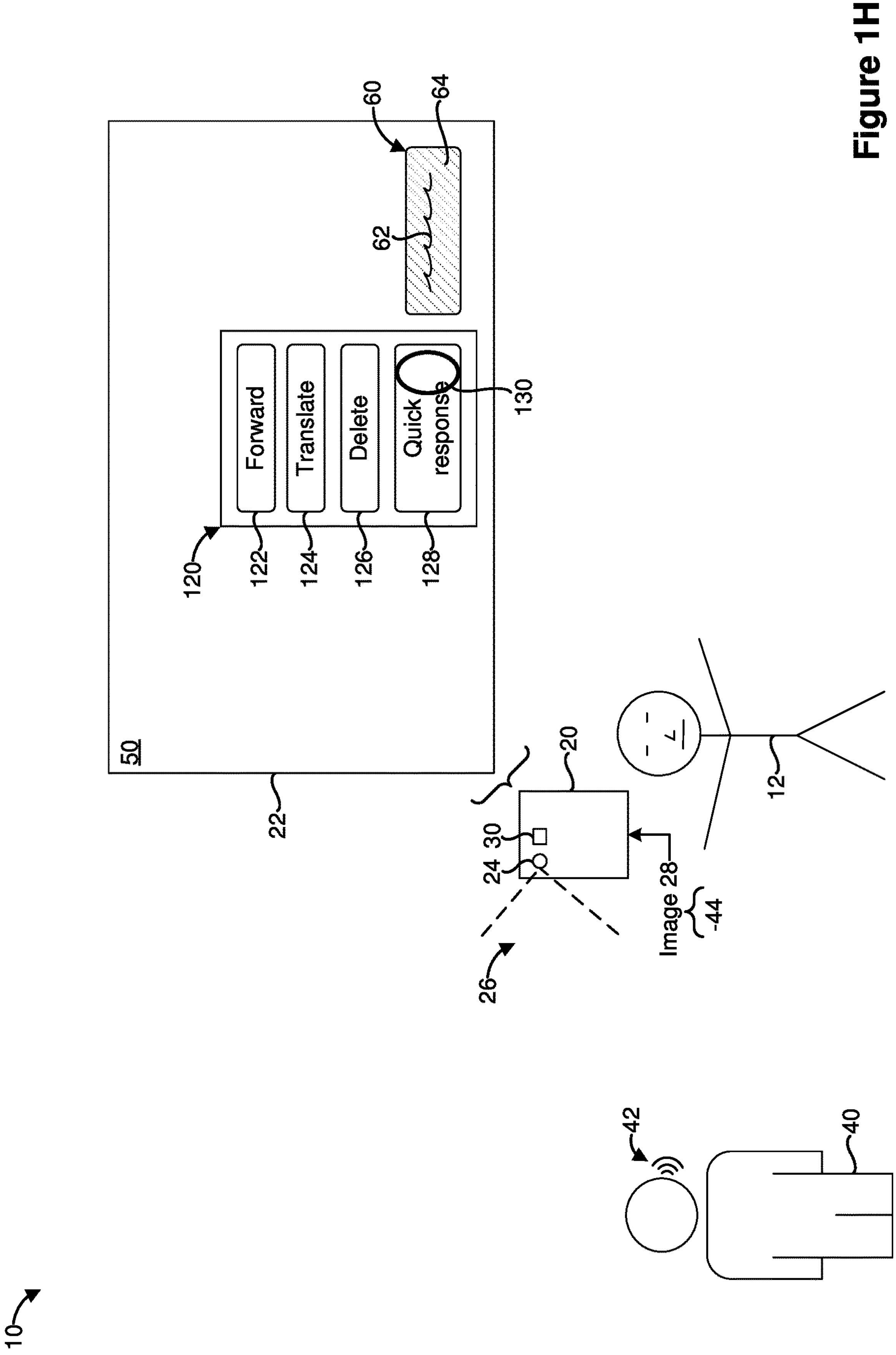

In the example of FIG. 1G, the electronic device 20 detects a user input 110 directed to the first message 60. The user input 110 may include a contact with a location corresponding to the first message 60 (e.g., a tap input or a long press directed to the first message 60, a gesture performed while gazing at the first message 60, etc.). As shown in FIG. 1H, in response to detecting the user input 110, the electronic device 20 displays a menu 120 with a forward affordance 122 for forwarding the first message 60, a translate affordance 124 for translating the first message 60 into a different language, a delete affordance 126 for deleting the first message 60 and a quick response affordance 128 for generating a set of suggested responses to the first message 60.

Figure 1I:
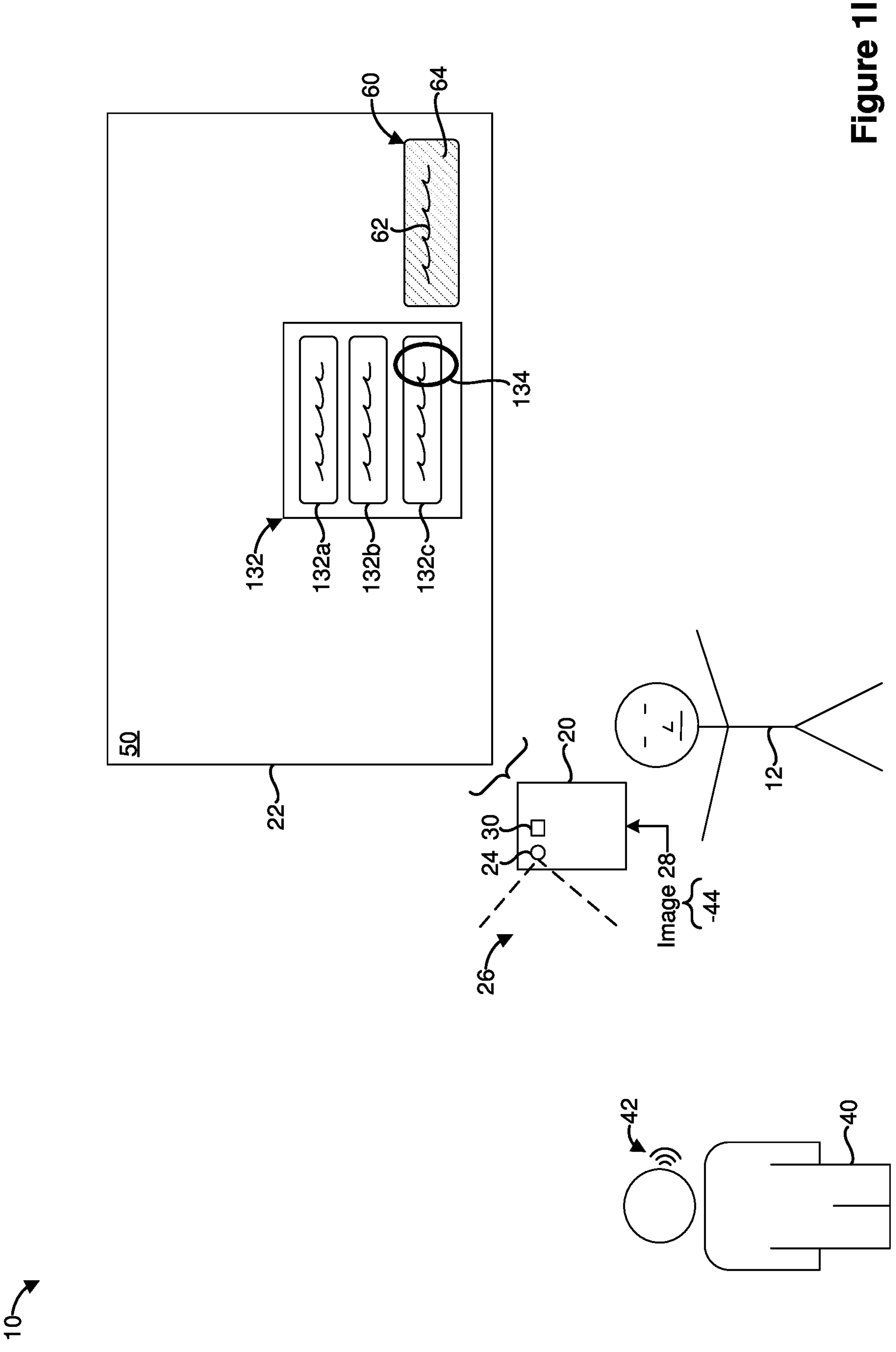
Figure 1J:
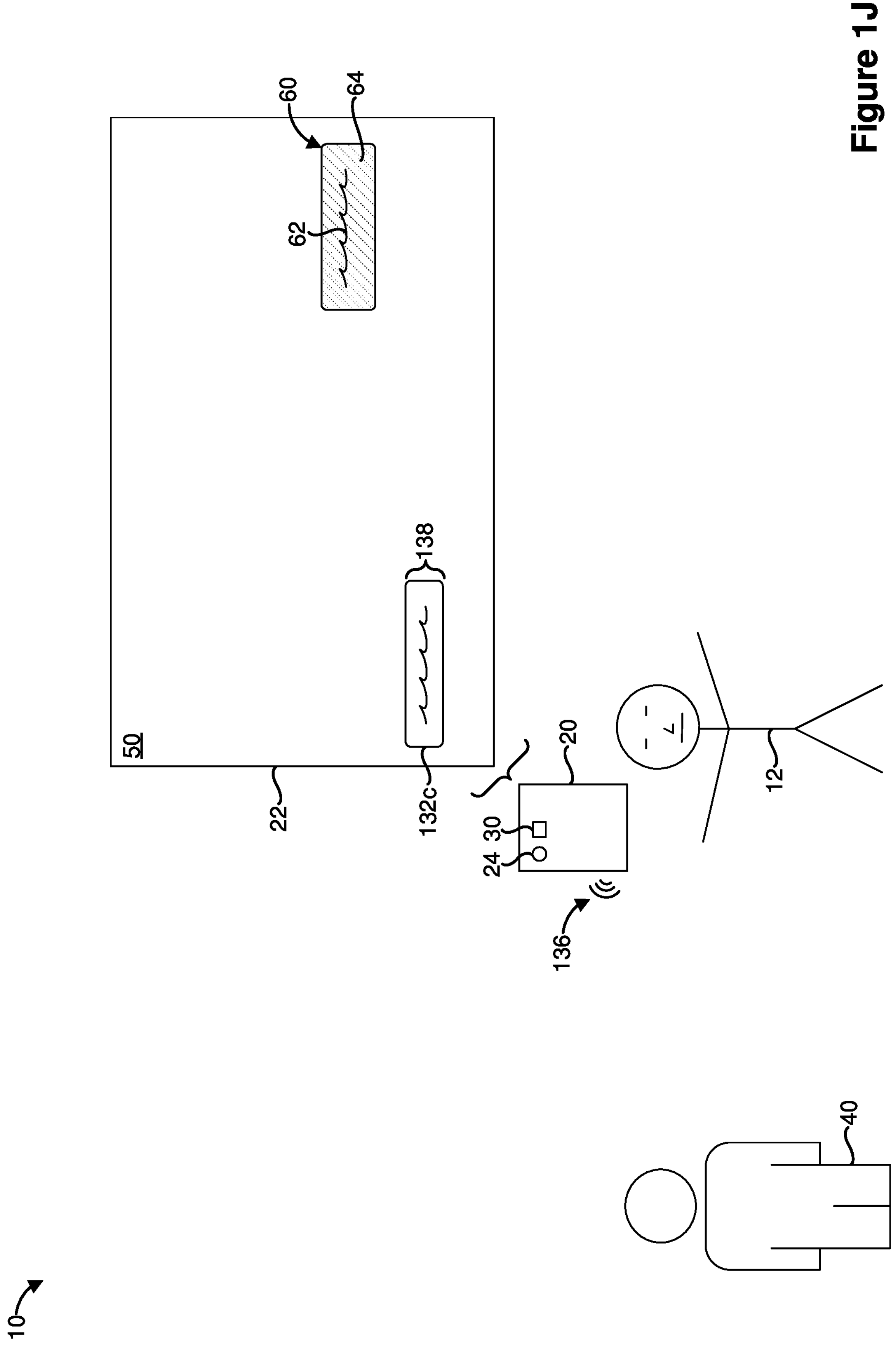

In the example of FIG. 1H, the electronic device 20 detects a user input 130 directed to the quick response affordance 128. As shown in FIG. 1I, in response to detecting the user input 130 (shown in FIG. 1H), the electronic device 20 displays a set of suggested responses 132 that includes a first suggested response 132*a*, a second suggested response 132*b* and a third suggested response 132*c*. The electronic device 20 detects a user input 134 directed to the third suggested response 132*c*. As shown in FIG. 1J, in response to the user input 134 (shown in FIG. 1I), the electronic device 20 displays the third suggested response 132*c* as a message (e.g., within a message element, for example, within a message bubble) within the messaging interface 50. Displaying the third suggested response 132*c* within the messaging interface 50 serves as a historical record that the user 12 responded to the first message 60 with the third suggested response 132*c*. In some implementations, the electronic device 20 generates and outputs an audible signal 136 that corresponds to the third suggested response 132*c*. The electronic device 20 performs a text-to-speech operation to generate the audible signal 136. In some implementations, the electronic device 20 displays the third suggested response 132*c* with a first size 138 that may be the same as a size of the first message 60.

Figure 1K:
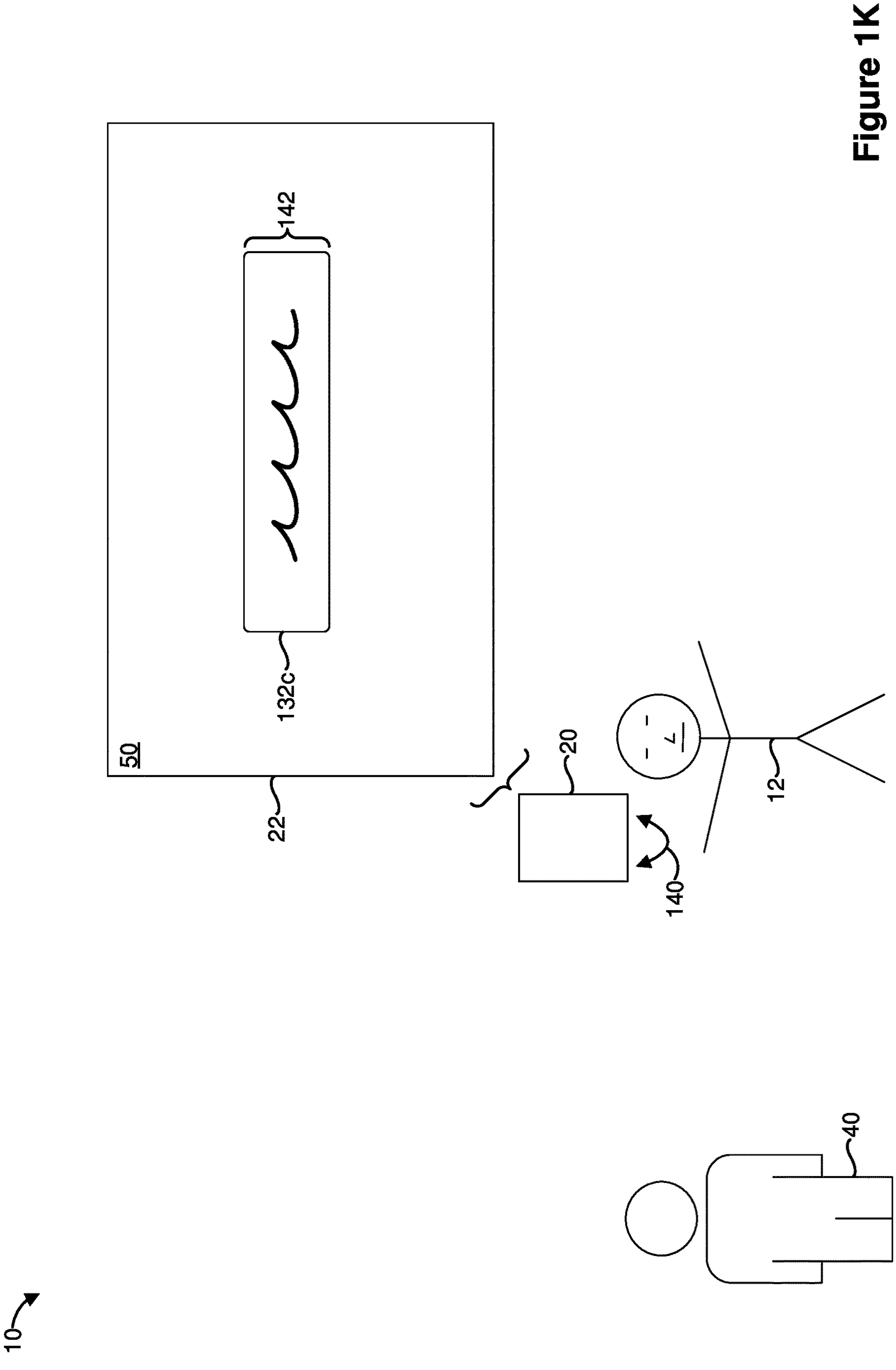

Referring to FIG. 1K, the electronic device 20 detects a manipulation 140 of the electronic device 20 by the user 12. For example, the electronic device 20 detects that the user 12 has flipped the electronic device 20 (e.g., rotated the electronic device 20) so that the display 22 faces the person 40. In response to detecting the manipulation 140, the electronic device 20 displays the third suggested response 132*c* with a second size 142 that is greater than the first size 138 shown in FIG. 1J (e.g., the squiggly line representing the third suggested response 132*c* in FIG. 1K is larger than the squiggly line representing the third suggested response 132*c* in FIG. 1J). Displaying the third suggested response 132*c* with the second size 142 allows the person 40 to view the third suggested response 132*c* without requiring the user 12 to speak the third suggested response 132*c*. In some implementations, the third suggested response 132*c* may be in a language that the user 12 is not conversant in, and displaying the third suggested response 132*c* with the second size 142 allows the user 12 to communicate with the person 40 even though the user 12 is not conversant in the language that the person 40 is speaking.

Figure 1L:
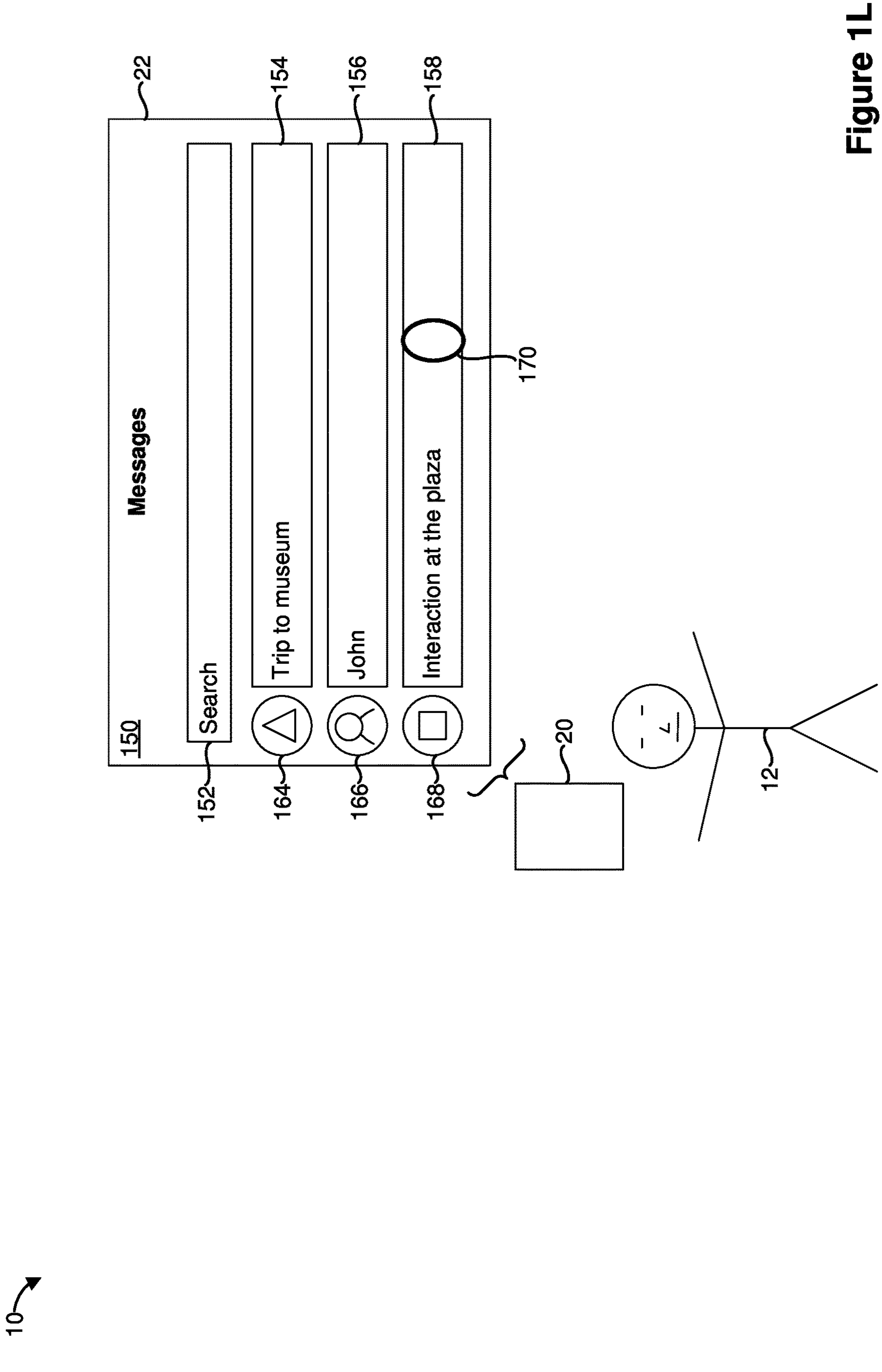

FIG. 1L illustrates a messages screen 150 that includes a list of message threads. In various implementations, the text representations of speech detected in various physical environments are stored as message threads that are accessible via the messages screen 150. In some implementations, the messages corresponding to speech detected in various physical environments of the electronic device 20 are intermingled with messages that the electronic device 20 receives or transmits via wireless communications. In the example of FIG. 1L, the messages screen 150 includes a search box 152, a first message thread indicator 154, a second message thread indicator 156 and a third message thread indicator 158. The user 12 can scroll through the messages screen 150 to view additional message thread indicators that are currently not shown.

In some implementations, the search box 152 allows the user 12 to search through message threads including messages that correspond to text representations of speech detected in various physical environments of the electronic device 20. For example, via the search box 152, the user 12 can search for phrases that the person 40 may have uttered and the electronic device 20 may present the first message 60 shown in FIG. 1B. The search box 152 allows the user 12 to find information that may have been disseminated by a person (e.g., the person 40 shown in FIG. 1B) via speech.

In the example of FIG. 1L, the first message thread indicator 154 corresponds to a first message thread that includes messages corresponding to speech detected at a museum. For example, the user 12 may have recently visited the museum and taken a guided trip with a guide. After receiving informed consent, the electronic device 20 may have displayed and stored text representations of the speech uttered by the guide as messages within the first message thread. The user 12 can select the first message thread indicator 154 to view the messages corresponding to text representations of speech detected during the museum trip. The first message thread indicator 154 may be associated with a first graphic 164 (e.g., a picture of the museum, for example, an image that the electronic device 20 captured during the trip to the museum).

The second message thread indicator 156 corresponds to a second message thread that includes messages electronically sent to or received from another device corresponding to a person named John. Selecting the second message thread indicator 156 causes the electronic device 20 to display the messages in the second message thread. The second message thread indicator 156 may be associated with a second graphic 166 (e.g., a picture of John retrieved from a contacts application installed on the electronic device 20).

The third message thread indicator 158 corresponds to a third message thread that includes messages corresponding to speech detected at a plaza. For example, the user 12 may have recently visited the plaza and spoken to people at the plaza. After receiving informed consent, the electronic device 20 may have displayed and stored text representations of the speech uttered by the people that the user 12 interacted with at the plaza. As an example, the user may have had the interaction illustrated in FIG. 1B at the plaza. The user 12 can select the third message thread indicator 158 to view the messages corresponding to text representations of speech detected during the plaza trip. The third message thread indicator 158 may be associated with a third graphic 168 (e.g., a picture of the person that the user 12 interacted with at the plaza or a picture of the plaza).

Figure 1M:
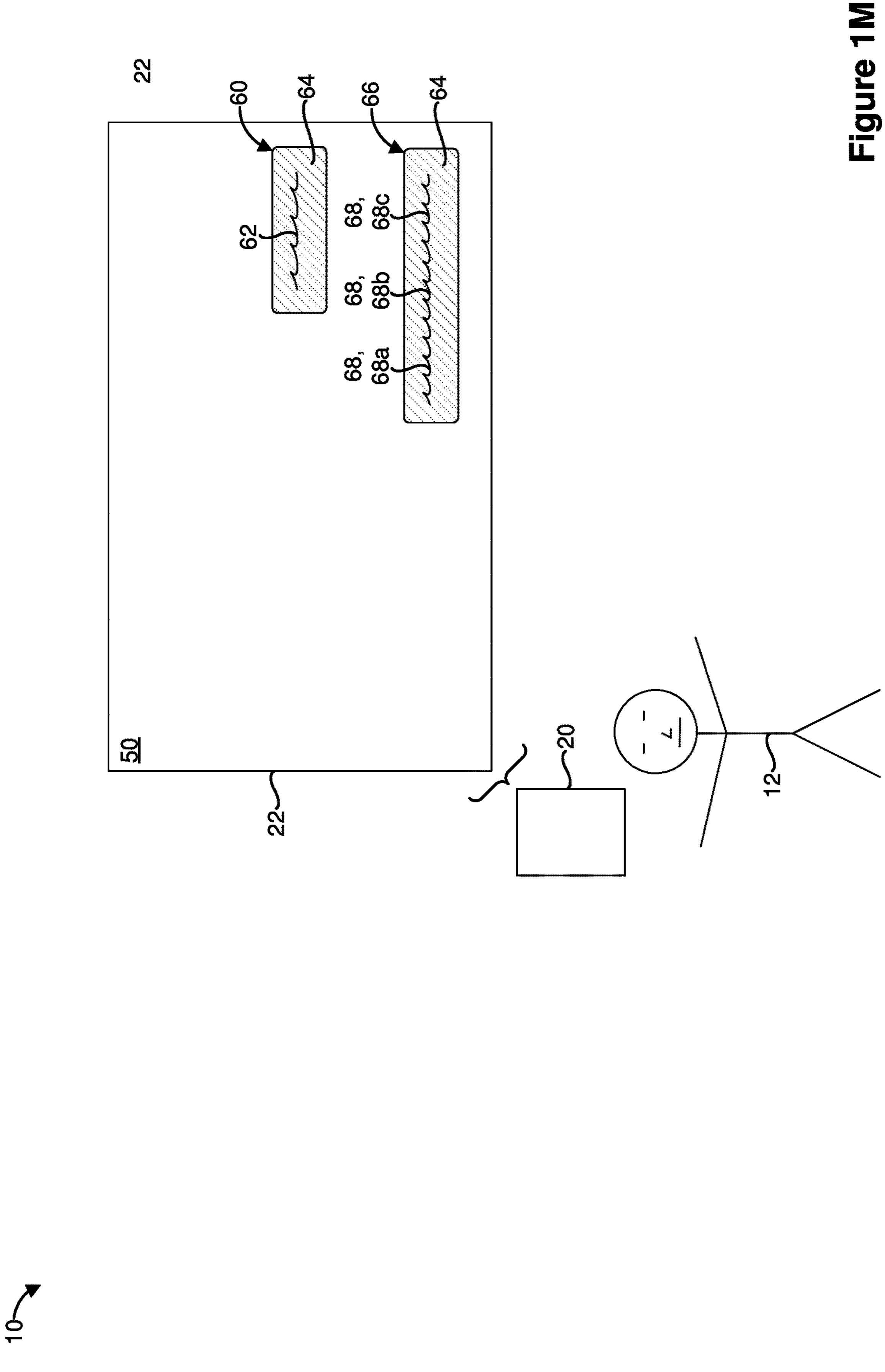

In the example of FIG. 1L, the electronic device 20 detects a user input 170 directed to the third message thread indicator 158. In response to detecting the user input 170, the electronic device 20 displays the third message thread. For example, as shown in FIG. 1M, in response to detecting the user input 170, the electronic device 20 may display the messages 60 and 66 which were discussed in more detail in relation to FIG. 1D.

Figure 2:
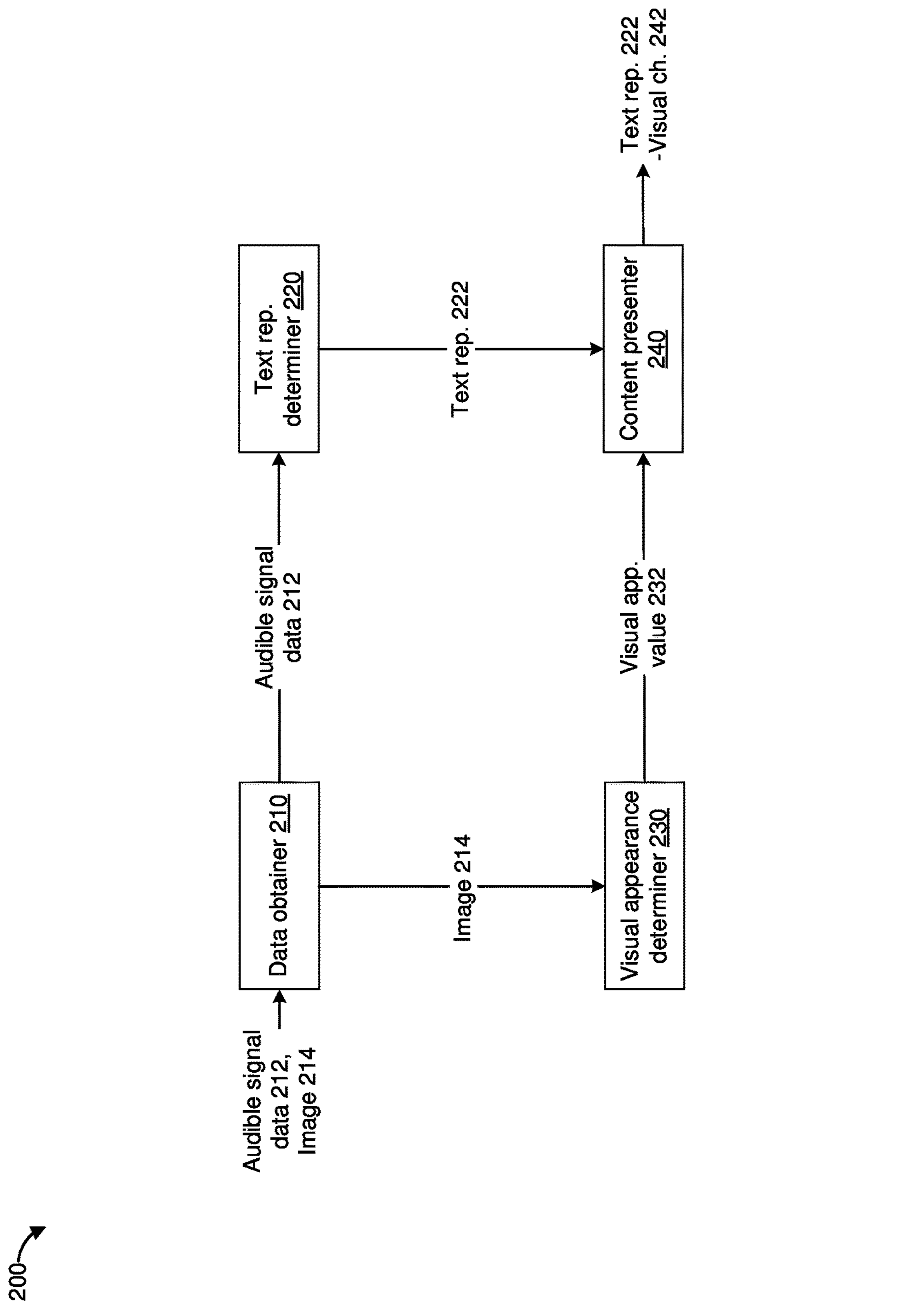
FIG. 2 is a diagram of a content presentation system in accordance with some implementations.

FIG. 2 is a block diagram of a content presentation engine 200 in accordance with some implementations. In some implementations, the content presentation engine 200 resides at the electronic device 20 shown in FIGS. 1A-1M. In various implementations, the content presentation engine 200 includes a data obtainer 210, a text representation determiner 220, a visual appearance determiner 230 and a content presenter 240.

In various implementations, the data obtainer 210 obtains audible signal data 212. In some implementations, the data obtainer 210 receives the audible signal data 212 from an audio sensor that receives an audible signal and generates the audible signal data 212 by converting the audible signal into the audible signal data 212. In some implementations, the audible signal data 212 is an electronic representation of the audible signal 42 shown in FIG. 1A-1D, the audible signal 72 shown in FIG. 1C and/or the audible signal 92 shown in FIGS. 1E and 1F.

In some implementations, the data obtainer 210 obtains an image 214 of a portion of a physical environment. For example, the data obtainer 210 obtains the image 28 shown in FIGS. 1A-1I. In some implementations, the data obtainer 210 receives the image 214 from an image sensor that captures the image 214. For example, the data obtainer 210 receives the image 214 from the image sensor 24 shown in FIGS. 1A-1J. In some implementations, the portion of the physical environment includes a source of the audible signal data 212, and the image 214 includes pixels that correspond to a 2D representation of the source. For example, the portion of the physical environment includes a person (e.g., the person 40 shown in FIGS. 1A-1D and 1G-1K, or the person 70 shown in FIG. 1C), a device (e.g., the device 90 shown in FIGS. 1E and 1F) or an object that generated a sound corresponding to the audible signal data 212.

In some implementations, the data obtainer 210 obtains the image 214 in response to obtaining the audible signal data 212. For example, in some implementations, the data obtainer 210 receives the audible signal data 212. After receiving the audible signal data 212, the data obtainer 210 performs an audio localization operation in order to identify a portion of a physical environment that is a likely source of an audible signal that the audible signal data 212 represents. For example, the data obtainer 210 identifies a particular location within the physical environment that is generating a sound corresponding to the audible signal data 212. After identifying a portion of the physical environment that corresponds to (e.g., is generating) the audible signal data 212, the data obtainer 210 causes an image sensor to capture the image 214 of the portion of the physical environment.

In various implementations, the text representation determiner 220 determines a text representation 222 of the audible signal data 212. In some implementations, the text representation determiner 220 includes a speech-to-text converter that converts the audible signal data 212 into the text representation 222. In some implementations, the text representation determiner 220 includes a transcription generator that generates the text representation 222 by generating a transcript of the audible signal data 212. In some implementations, the text representation 222 is in the same language as speech represented by the audible signal data 212.

In some implementations, the text representation determiner 220 includes a translation engine that translates the text representation 222 from a first language to a second language. As such, in some implementations, the audible signal data 212 represents speech in the first language and the text representation 222 is in the second language. For example, referring to FIG. 1B, the person 40 may be speaking Italian and the first text representation 62 may be in English. In some implementations, the text representation determiner 220 determines to perform a translation operation when the audible signal data 212 represents speech in a language that is different from a preferred language of the user 12 shown in FIG. 1A-1M (e.g., when the audible signal data 212 represents speech in a language that is different from a default language of the electronic device 20 shown in FIGS. 1A-1M).

In various implementations, the visual appearance determiner 230 determines a visual appearance value 232 that characterizes (e.g., indicates) a visual appearance of a portion of a physical environment depicted in the image 214. In some implementations, the visual appearance value 232 indicates a color of the portion of the physical environment. For example, the visual appearance value 232 may include a set of color values for respective pixels of the image 214. As an example, the visual appearance value 232 may include RGB values for a set of pixels that correspond to a source of the audible signal data 212.

In some implementations, a source of the audible signal data 212 is a person (e.g., the person 40 shown in FIGS. 1A-1D), and the visual appearance determiner 230 generates the visual appearance value 232 by identifying a color associated with the person. For example, the visual appearance determiner 230 identifies a color of an article of clothing that the person is wearing, a color of an accessory that the person is carrying and/or a color of the person. In some implementations, the person may be associated with multiple colors and the visual appearance determiner 230 selects one of the colors that appears to be more dominant. For example, a person may be wearing a shirt of a first color and a pant of a second color, and the visual appearance value 232 may indicate the first color because the user 12 is more likely to remember the color of the shirt as a result of gazing more often at the shirt than the pant. In some implementations, the source of the audible signal data 212 is a device (e.g., the device 90 shown in FIGS. 1E and 1F), and the visual appearance value 232 indicates a color of the device.

In some implementations, the visual appearance value 232 indicates a size of a source of the audible signal data 212. For example, the visual appearance value 232 may indicate whether the person speaking is an adult or a child. As another example, the visual appearance value 232 may indicate whether the device generating the audible signal data 212 is a big screen television or a small media player.

In some implementations, the source of the audible signal data 212 is a person and the visual appearance value 232 characterizes a facial expression of the person. For example, the visual appearance value 232 may indicate whether the person is angry, happy, sad, worried, etc. In some implementations, the visual appearance value 232 characterizes a body language of the person. For example, the visual appearance value 232 may indicate whether the person is exhibiting a friendly body pose, a caring body pose, an aggressive body pose, a combative body pose, etc.

In various implementations, the content presenter 240 presents the text representation 222 as a message with a visual characteristic value 242 that is based on the visual appearance value 232. For example, referring to FIG. 1B, the content presenter 240 displays the first message 60 including the first text representation 62 with the first visual characteristic 64. In some implementations, the content presenter 240 displays the message within a messaging interface of a messaging application (e.g., the messaging interface 50 shown in FIG. 1B).

In some implementations, the visual characteristic value 242 corresponds to a color of a message bubble that encompasses the text representation 222 (e.g., a color of the first message 60 shown in FIG. 1B). For example, the visual characteristic value 242 characterizes a background color of the text representation 222. As an example, the visual appearance value 232 includes a color value and the content presenter 240 selects the visual characteristic value 242 to be the same color value as the visual appearance value 232. In some implementations, the visual characteristic value 242 corresponds to a font color of the text representation 222. As an example, if the visual appearance value 232 corresponds to a red color (e.g., because a person uttering speech corresponding to the audible signal data 212 is wearing a red shirt), the content presenter 240 may display the text representation 222 in a red font color or the content presenter 240 may display the text representation 222 in a black font color within a message bubble with a red background. In this example, displaying the text representation 222 with the red font or the red background makes it easier for the user 12 to associate the text representation 222 to the person wearing the red shirt.

In some implementations, the visual characteristic value 242 corresponds to a size of the message bubble that encompasses the text representation 222 (e.g., a size of the first message 60 shown in FIG. 1B). In some implementations, the visual characteristic value 242 corresponds to a font size of the text representation 222. In some implementations, the visual appearance value 232 indicates a size of the source that generated the audible signal data 212, and the size of the message bubble and/or the font size are based on (e.g., proportional to) the size of the source. As an example, the content presenter 240 may display the text representation 222 with a first font size (e.g., a relatively large font size, for example, 14 point font) when the visual characteristic value 242 indicates that the audible signal data 212 corresponds to speech being uttered by an adult, and the content presenter 240 may display the text representation 222 with a second font size (e.g., a relatively small font size, for example, 10 point font) when the visual characteristic value 242 indicates that the audible signal data 212 corresponds to speech being uttered by a child.

In some implementations, the visual characteristic value 242 corresponds to a font that is used to display the text representation 222. In some implementations, the content presenter 240 utilizes a first font to display the text representation 222 when the visual appearance value 232 is above a threshold value and the content presenter 240 utilizes a second font to display the text representation 222 when the visual appearance value 232 is below the threshold value. For example, the content presenter 240 may utilize a first font to display the text representation 222 when the audible signal data 212 corresponds to speech being uttered by a child and a second font when the audible signal data 212 corresponds to speech being uttered by an adult.

In some implementations, the visual appearance value 232 indicates a formality of a person uttering speech that corresponds to the audible signal data 212. For example, the visual appearance value 232 may indicate whether the person is dressed casually (e.g., wearing jeans and a T-shirt), wearing a business casual outfit (e.g., khaki pants and a buttoned shirt) or a formal business outfit (e.g., a suit). In some implementations, the visual characteristic value 242 is based on the formality of the person uttering the speech that corresponds to the audible signal data 212. For example, the content presenter 240 may utilize a first font to display the text representation 222 when the person uttering the speech is dressed casually, a second font when the person is wearing a business casual outfit and a third font when the person is wearing a formal business outfit.

In some implementations, the visual appearance value 232 indicates a facial expression of a person uttering speech that corresponds to the audible signal data 212. For example, the visual appearance value 232 indicates whether the person uttering the speech has a serious facial expression, a happy facial expression, an angry facial expression, a friendly facial expression, etc. In some implementations, the content presenter 240 sets the visual characteristic value 242 based on the facial expression of the person uttering the speech corresponding to the audible signal data 212. As an example, the content presenter 240 may display the text representation 222 with a red background when the visual appearance value 232 indicates that the person uttering the speech has an angry facial expression, and the content presenter 240 may display the text representation 222 with a green background when the visual appearance value 232 indicates that the person uttering the speech has a friendly facial expression.

In some implementations, the visual appearance value 232 indicates an ambience (e.g., a mood) of a portion of the physical environment that an audible signal corresponding to the audible signal data 212 is originating from. As an example, the visual appearance value 232 may indicate whether the mood of the physical environment is somber, festive, playful, studious, inspirational, etc. In some implementations, the content presenter 240 sets the visual characteristic value 242 based on the ambience of the portion of the physical environment where the audible signal corresponding to the audible signal data 212 originated from. As an example, the content presenter 240 may display the text representation 222 with a dark gray background when the visual appearance value 232 indicates that the mood of the physical environment is somber, and the content presenter 240 may display the text representation 222 with a colorful background (e.g., an orange background) when the visual appearance value 232 indicates that the mood of the physical environment is cheerful, festive or celebratory.

In some implementations, the content presenter 240 determines an audio characteristic of the audible signal data 212 and sets the visual characteristic value 242 based on the audio characteristic of the audible signal data 212. For example, the content presenter 240 may determine an amplitude of the audible signal data 212 and select between uppercase letters and lowercase letters for displaying the text representation 222 based on the amplitude of the audible signal data 212. As an example, the content presenter 240 may display the text representation 222 in uppercase letters when the amplitude is greater than a threshold amplitude, and the content presenter 240 may display the text representation 222 in lowercase letters when the amplitude is less than the threshold amplitude.

Figure 3:
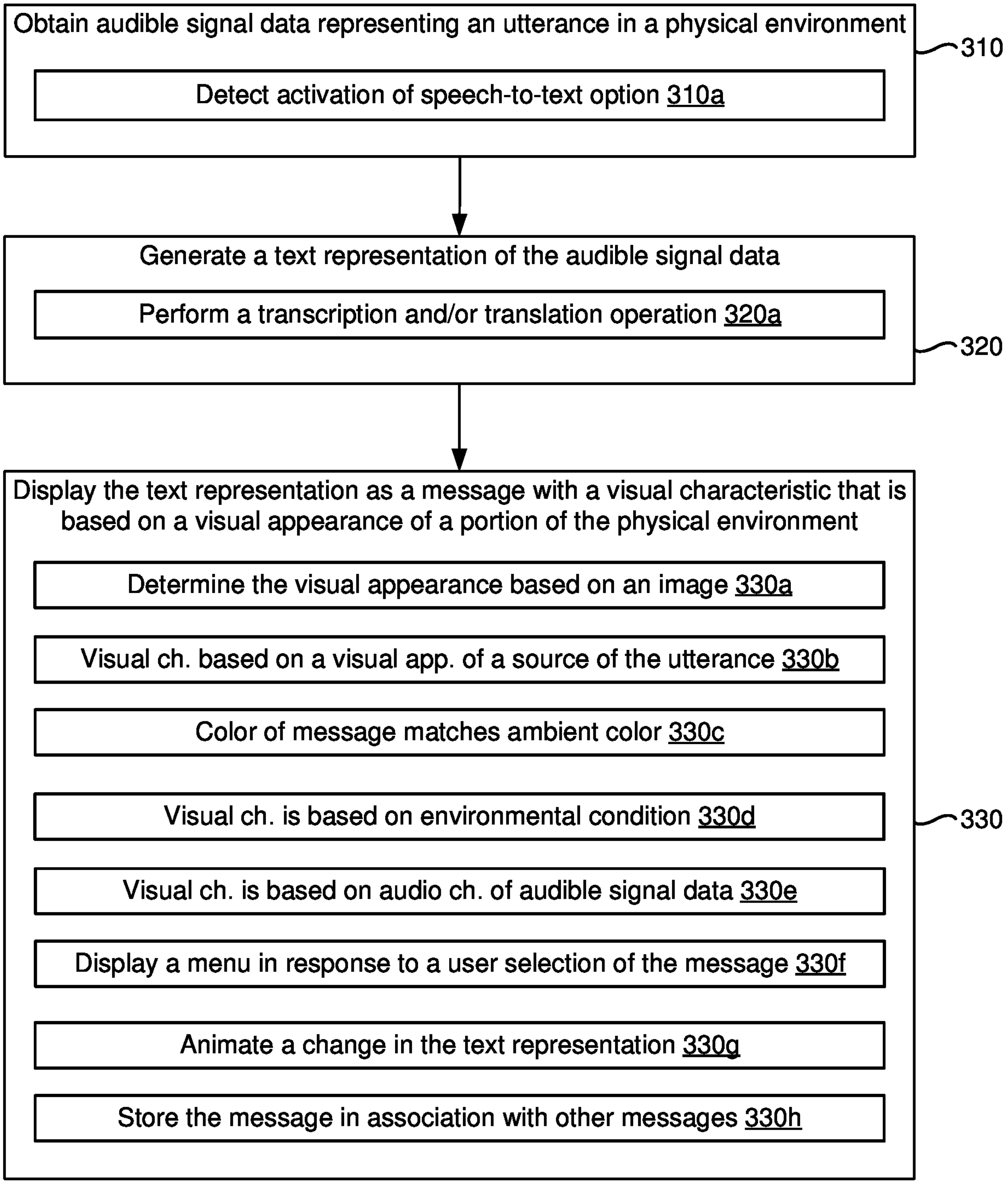
FIG. 3 is a flowchart representation of a method of presenting a visual representation of audible signal data in accordance with some implementations.

FIG. 3 is a flowchart representation of a method 300 for presenting a visual representation of audible signal data based on a visual appearance of a physical environment of a device. In various implementations, the method 300 is performed by the electronic device 20 shown in FIG. 1A-1M and/or the content presentation engine 200 shown in FIG. 2. In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in various implementations, the method 300 includes obtaining, via the audio sensor, audible signal data representing an utterance uttered in a physical environment of the device. For example, as described in relation to FIG. 1A, the audio sensor 30 receives the audible signal 42 that corresponds to speech being uttered by the person 40, and the audio sensor 30 converts the audible signal 42 into audible signal data. As another example, as shown in FIG. 2, the data obtainer 210 obtains the audible signal data 212.

As represented by block 310*a*, in some implementations, the method 300 includes detecting an activation of a speech-to-text option. For example, referring to FIG. 1A, in some implementations, the electronic device 20 displays a selectable affordance that, when selected, causes the electronic device 20 to display text representations of speech detected in the physical environment 10. In some implementations, the electronic device 20 displays the first message 60 shown in FIG. 1B after detecting a user input directed to the selectable affordance that causes the electronic device 20 to display the text representations of the speech detected in the physical environment 10. As such, in some implementations, the device displays and stores text representations of detected speech as messages within a messaging application in response to a user request requesting the device to display and persistently store text representations of speech uttered in the physical environment of the device.

As represented by block 320, in various implementations, the method 300 includes generating a text representation of the audible signal data. For example, as shown in FIG. 1B, the electronic device 20 generates the first text representation 62 of the audible signal 42. As another example, as shown in FIG. 2, the text representation determiner 220 determines the text representation 222 of the audible signal data 212. As represented by block 320*a*, in some implementations, generating the text representation includes utilizing a speech-to-text converter to perform a transcription operation. For example, as described in relation to FIG. 2, in some implementations, the text representation determiner 220 includes a speech-to-text converter that generates a transcription of the audible signal data 212.

In some implementations, generating the text representation includes performing a translation operation so that the text representation is in a different language than the audible speech data. For example, as described in relation to FIG. 2, in some implementations, the text representation determiner 220 includes a translation engine that generates the text representation 222 by translating a transcript of the audible signal data from a first language into a second language (e.g., from a language spoken by the person 40 to a language understood by the user 12 of the electronic device 20).

As represented by block 330, in various implementations, the method 300 includes displaying, on the display, within a messaging interface, the text representation as a message with a visual characteristic that is based on a visual appearance of a portion of the physical environment. For example, as shown in FIG. 1B, the electronic device 20 displays the first text representation 62 as the first message 60 within the messaging interface 50, and the first message 60 has the first visual characteristic 64 that is based on the visual appearance 44 of the person 40.

Setting the visual characteristic of the message based on the visual appearance of the portion of the physical environment allows a user of the electronic device to more easily associate the text representation with the portion of the physical environment where the audible signal data was detected. For example, when the user refers back to the text representation of the audible signal data at a later time, the distinct visual characteristic of the message may help the user in recalling details regarding the physical environment where the user first heard the speech corresponding to the text representation. As an example, displaying the text representation with a red background or with a red font may help the user recall that the text representation corresponds to speech that was uttered by a person wearing a red dress.

As represented by block 330*a*, in some implementations, the device further includes an image sensor, and the method 300 further comprises determining the visual appearance of the portion of the physical environment based on an image captured by the image sensor. For example, as shown in FIG. 1B, the electronic device 20 includes the image sensor 24, and the electronic device 20 determines the visual appearance 44 of the person 40 based on the image 28 captured by the image sensor 24. In some implementations, the method 300 includes performing instance segmentation and/or semantic segmentation in order to identify the portion of the physical environment and determine the visual appearance of the portion of the physical environment. For example, the device may perform instance segmentation and/or semantic segmentation in order to identify pixels that correspond to a dress of the person uttering the speech and then identify respective colors of the pixels that correspond to the dress.

As represented by block 330*b*, in some implementations, the portion of the physical environment corresponds to a source of the utterance, and displaying the message with the visual characteristic includes setting the visual characteristic of the message based on the visual appearance of the source of the utterance. For example, as discussed in relation to FIG. 1B, in some implementations, the electronic device 20 determines the visual appearance 44 of the person 40 that is uttering speech represented by the audible signal 42 and the electronic device 20 displays the first message 60 with the first visual characteristic 64 that is based on the visual appearance 44 of the person 40.

In some implementations, the source of the utterance is a person in the physical environment of the device, and a color of the message matches a color of an article of clothing that the person is wearing. For example, referring to FIG. 1B, in some implementations, the visual appearance 44 of the person 40 may indicate a color of an article of clothing that the person 40 is wearing and displaying the first message 60 with the first visual characteristic 64 may include displaying the first text representation 62 with a background color or a font color that matches the color of the article of clothing that the person 40 is wearing. As an example, when the visual appearance 44 indicates that the person 40 is wearing a green golf shirt, the first message 60 is displayed using the color green (e.g., the first text representation 62 may be displayed with a green font color with a white background).

In some implementations, the source of the utterance is another device in the physical environment, and a color of the message matches a color of the other device. For example, as shown in FIGS. 1E and 1F, the electronic device 20 determines the visual appearance 94 of the device 90 that is generating the audible signal 92 and the electronic device 20 displays the message 100 with the visual characteristic 104 that is based on the visual appearance 94 of the device 90. As an example, if the visual appearance 94 indicates that the device 90 is orange, the electronic device 20 can display the text representation 102 with an orange background or with an orange font color.

In some implementations, the color of the message includes a background color of the message. In some implementations, the text representation is displayed within a message bubble and the device sets the color of the message bubble to match the color indicated by the visual appearance of the portion of the physical environment. In some implementations, the color of the message includes a font color of the text representation. In some implementations, the device displays the text representation with a font color that matches (e.g., is the same as or is similar to) a color indicated by the visual appearance of the portion of the physical environment.

As represented by block 330*c*, in some implementations, a color of the message matches an ambient color of the portion of the physical environment. In some implementations, the visual appearance indicates an ambient color of the portion of the physical environment, and the device displays the message with a color that matches the ambient color indicated by the visual appearance. In some implementations, the visual appearance indicates a color of a light source in the physical environment and the device displays the message with a color that matches the color of the light source. In some implementations, the visual appearance indicates a color of a physical article in the physical environment (e.g., a color of a wall or a color of furniture) and the device displays the message with a color that matches the color of the physical article in the physical environment.

As represented by block 330*d*, in some implementations, the visual appearance of the portion of the physical environment indicates an environmental condition, and the visual characteristic of the message is based on the environmental condition. For example, the visual appearance may indicate whether the physical environment is sunny or cloudy. As another example, the visual appearance may indicate whether it is raining or snowing in the physical environment. In some implementations, the device selects a background image of the message based on the environmental condition indicated by the visual appearance. For example, if the visual appearance indicates that it is snowing in the physical environment, the device can select a background image with snowflakes. As another example, if the visual appearance indicates that it is raining in the physical environment, the device can select a background image with raindrops.

As represented by block 330*e*, in some implementations, the visual characteristic of the message is further based on an audio characteristic associated with the audible signal data. In some implementations, the method 300 includes displaying the text representation using uppercase letters when an amplitude associated with the audible signal data is greater than a threshold amplitude and displaying the text representation using lowercase letters when the amplitude is less than the threshold amplitude. For example, referring to FIGS. 1E and 1F, the electronic device 20 displays the text representation 102 with lowercase letters when the amplitude 96 is less than the threshold amplitude 98 (as shown in FIG. 1E) and the electronic device 20 displays the text representation 102 with uppercase letters when the amplitude 96' is greater than the threshold amplitude 98.

As represented by block 330*f*, in some implementations, the method 300 includes detecting a user input directed to the message, and displaying a menu with a plurality of options including a forward option, a translate option, a delete option and a quick response option. For example, as shown in FIGS. 1G and 1H, the electronic device 20 detects the user input 110 shown in FIG. 1G (e.g., a tap or a long press directed to the first message 60) and displays the menu 120 shown in FIG. 1H.

In some implementations, the method 300 includes forwarding the message to another device in response to a selection of the forward option. For example, referring to FIG. 1H, in response to detecting a user input that is directed to the forward affordance 122, the electronic device 20 can display a list of recipients to whom the first message 60 can be electronically (e.g., wirelessly) forwarded. Upon detecting another user input that is directed to one of the recipients in the list of recipients, the electronic device 20 can transmit the first message 60 to the selected recipient.

In some implementations, the method 300 includes translating the message into another language in response to a selection of the translate option. For example, referring to FIG. 1H, in response to detecting a user input that is directed to the translate affordance 124, the electronic device 20 can display a list of languages into which the first message 60 can be translated. Upon detecting another user input that is directed to one of the languages in the list of languages, the electronic device 20 can perform a translation operation and display a translated version of the first message 60 (e.g., by replacing the first message 60 with the translated version of the first message 60).

In some implementations, the method 300 includes displaying a set of suggested responses to the message in response to a selection of the quick response option. For example, referring to FIG. 1H, the electronic device 20 detects the user input 130 directed to the quick response affordance 128. As shown in FIG. 1I, in response to detecting the user input 130 shown in FIG. 1H, the electronic device 20 displays the suggested responses 132 shown in FIG. 1I.

In some implementations, the method 300 includes outputting an audible signal corresponding to a selected one of the set of suggested responses. For example, referring to FIGS. 1I and 1J, the electronic device 20 detects the user input 134 directed to the third suggested response 132*c*. As shown in FIG. 1J, in response to detecting the user input 134 shown in FIG. 1I, the electronic device 20 generates and outputs the audible signal 136 via a speaker of the electronic device 20 so that the person 40 may hear an audio version of the third suggested response 132*c*.

In some implementations, the method 300 includes increasing a text size of a selected one of the set of suggested responses in response to a manipulation of the device to face a source of the utterance. For example, referring to FIGS. 1J and 1K, the electronic device 20 increases a font size of the third suggested response 132*c* from the first size 138 (shown in FIG. 1J) to the second size 142 (shown in FIG. 1K) that is greater than the first size 138 so that the person 40 can more easily read the third suggested response 132*c*.

As represented by block 330*g*, in some implementations, the method 300 includes animating a portion of the text representation that is changed by a speech-to-text converter during transcription. For example, as shown in FIG. 1D, in some implementations, the second portion 68*b* of the text representation 68 can be animated in order to indicate that the second portion 68*b* of the text representation 68 has been updated. Animating the portion may draw the user's attention to a correction that changes an underlying meaning of the text representation 68. In some implementations, words generated from newly obtained audible signal data may be animated (e.g., by increasing its opacity) onto the display to indicate their addition to the displayed text representation. In some implementations, no animation may be performed when updating previously displayed portions of a text representation. For example, the previously displayed portion of the text representation may be removed and the updated portion of the text representation may be displayed at full opacity.

As represented by block 330*h*, in some implementations, the method 300 includes storing, in the non-transitory memory, the message in association with other messages that the device has received or transmitted. For example, as shown in FIG. 1L, the messages screen 150 shows various message thread indicators including the first message thread indicator 154 for a first message thread corresponding to speech detected at the museum, the second message thread indicator 156 for a second message thread corresponding to messages transmitted or received from John, and the third message thread indicator 158 for a third message thread corresponding to speech detected at the plaza.

In some implementations, the method 300 includes detecting a user input that corresponds to a request to scroll through the messaging interface, and displaying another message that includes a text representation of previously obtained audible signal data. For example, referring to FIG. 1M, the user 12 may scroll through the messaging interface 50 to view previous messages that represent text representations of speech detected earlier in the physical interaction with the person 40 shown in FIG. 1D. In some implementations, the message is displayed with a first visual characteristic and the other message is displayed with a second visual characteristic. For example, messages corresponding to different times can be displayed with different levels of opacity. As an example, a message corresponding to a currently detected speech can be displayed with one hundred percent opacity, a message corresponding to speech detected ten minutes ago can be displayed with seventy-five percent opacity and a message corresponding to speech detected two hours ago can be displayed with fifty percent opacity. Displaying a message corresponding to currently detected speech with a greater opacity than messages corresponding to previously detected speech reduces the likelihood of the user becoming confused and mistaking previously detected speech for currently detected speech.

Figure 4:
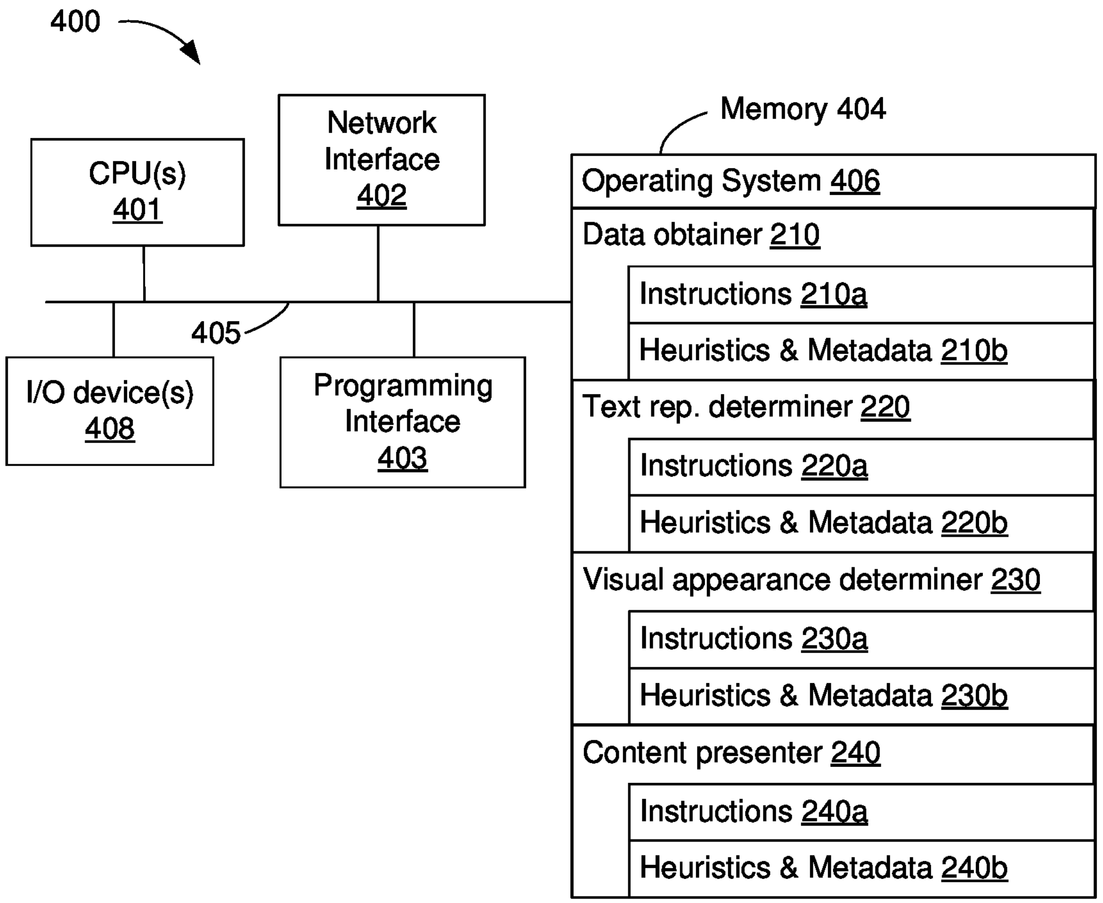
FIG. 4 is a block diagram of a device that presents a visual representation of audible signal data in accordance with some implementations.

FIG. 4 is a block diagram of a device 400 in accordance with some implementations. In some implementations, the device 400 implements the electronic device 20 shown in FIGS. 1A-1M and/or the content presentation engine 200 shown in FIG. 2. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 408, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the one or more I/O devices 408 include a display (e.g., the display 22 shown in FIGS. 1A-1M). In some implementations, the display includes an XR display. In some implementations, the display includes an opaque display. Alternatively, in some implementations, the display includes an optical see-through display. In some implementations, the one or more I/O devices 408 include an image sensor (e.g., the image sensor 24 shown in FIGS. 1A-1J). In some implementations, the one or more I/O devices 408 include an audio sensor (e.g., the audio sensor 30 shown in FIGS. 1A-1J).

In some implementations, the memory 404 or the non-transitory computer readable storage medium of the memory 404 stores the following programs, modules and data structures, or a subset thereof including an optional operating system 406, the data obtainer 210, the text representation determiner 220, the visual appearance determiner 230 and the content presenter 240. In various implementations, the data obtainer 210 includes instructions 210*a*, and heuristics and metadata 210*b* for obtaining (e.g., receiving or capturing) audible signal data corresponding to an utterance uttered in a physical environment (e.g., the audible signal data 212 shown in FIG. 2) and/or image data (e.g., the image 28 shown in FIGS. 1B-1I and/or the image 214 shown in FIG. 2). In various implementations, the text representation determiner 220 includes instructions 220*a*, and heuristics and metadata 220*b* for determining a text representation of the audible signal data (e.g., the first text representation 62 shown in FIG. 1B, the second text representation 82 shown in FIG. 1C, the text representation 68 shown in FIG. 1D, the text representation 102 shown in FIG. 1E and/or the text representation 222 shown in FIG. 2). In various implementations, the visual appearance determiner 230 includes instructions 230*a*, and heuristics and metadata 230*b* for determining a visual appearance of a portion of a physical environment (e.g., the visual appearance 44 shown in FIG. 1B, the visual appearance 74 shown in FIG. 1C, the visual appearance 94 shown in FIG. 1E and/or the visual appearance value 232 shown in FIG. 2). In various implementations, the content presenter 240 includes instructions 240*a*, and heuristics and metadata 240*b* for displaying, within a messaging interface, the text representation as a message with a visual characteristic that is based on the visual appearance (e.g., for determining the first visual characteristic 64 shown in FIG. 1B, the second visual characteristic 84 shown in FIG. 1C, the visual characteristic 104 shown in FIG. 1E, the visual characteristic 104' shown in FIG. 1F and/or the visual characteristic value 242 shown in FIG. 2). In various implementations, the device 400 performs the method 300 shown in FIG. 3.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

As described above, one aspect of the present technology is the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users.

Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:

at a device comprising an audio sensor, a display, one or more processors, and a non-transitory memory:

obtaining, via the audio sensor, audible signal data representing an utterance uttered in a physical environment of the device;

generating a text representation of the audible signal data; and displaying, on the display, within a messaging interface, the text representation as a message with a visual characteristic that indicates a visual appearance of a portion of the physical environment.

2. The method of claim 1, wherein the device further comprises an image sensor, and the method further comprises determining the visual appearance of the portion of the physical environment based on an image captured by the image sensor.

3. The method of claim 1, wherein the portion of the physical environment corresponds to a source of the utterance, and wherein displaying the message with the visual characteristic comprises setting the visual characteristic of the message based on a visual appearance of the source of the utterance.

4. The method of claim 3, wherein the source of the utterance is a person in the physical environment of the device, and a color of the message matches a color of an article of clothing that the person is wearing.

5. The method of claim 3, wherein the source of the utterance is another device in the physical environment, and a color of the message matches a color of the other device.

6. The method of claim 4, wherein the color of the message includes a background color of the message.

7. The method of claim 4, wherein the color of the message includes a font color of the text representation.

8. The method of claim 1, wherein a color of the message matches an ambient color of the portion of the physical environment.

9. The method of claim 1, wherein the visual appearance of the portion of the physical environment indicates an environmental condition, and wherein the visual characteristic of the message is based on the environmental condition.

10. The method of claim 1, wherein the visual characteristic of the message is further based on an audio characteristic associated with the audible signal data.

11. The method of claim 10, wherein displaying the message comprises displaying the text representation using uppercase letters when an amplitude associated with the audible signal data is greater than a threshold amplitude and displaying the text representation using lowercase letters when the amplitude is less than the threshold amplitude.

12. The method of claim 1, further comprising animating a portion of the displayed text representation while generating a text representation of newly obtained audible signal data.

13. The method of claim 3, wherein the source of the utterance is a person in the physical environment of the device, and a size of the message matches a size of the person.

14. The method of claim 1, further comprising:

obtaining, via the audio sensor, additional audible signal data representing an additional utterance uttered in the physical environment of the device;

generating an additional text representation of the additional audible signal data; and displaying, on the display, within the messaging interface, the additional text representation as an additional message with an additional visual characteristic that indicates a visual appearance of an additional portion of the physical environment, wherein the additional visual characteristic is different than the visual characteristic.

15. The method of claim 14, wherein:

the portion of the physical environment corresponds to a source of the utterance, the source of the utterance is a person in the physical environment, the additional portion of the physical environment corresponds to a source of the additional utterance, the source of the additional utterance is an additional person in the physical environment, a color of the message matches a color of an article of clothing that the person is wearing, and an additional color of the additional message matches an additional color of an article of clothing that the additional person is wearing, wherein the additional color is different from the color.

16. A device comprising:

an audio sensor;

a display;

one or more processors;

a non-transitory memory; and one or more programs stored in the non-transitory memory, which, when executed by the one or more processors, cause the device to:

obtain, via the audio sensor, audible signal data representing an utterance uttered in a physical environment of the device;

generate a text representation of the audible signal data; and display, on the display, within a messaging interface, the text representation as a message with a visual characteristic that indicates a visual appearance of a portion of the physical environment.

17. A non-transitory memory storing one or more programs, which, when executed by one or more processors of a device with an audio sensor and a display, cause the device to:

obtain, via the audio sensor, audible signal data representing an utterance uttered in a physical environment of the device;

generate a text representation of the audible signal data; and display, on the display, within a messaging interface, the text representation as a message with a visual characteristic that indicates a visual appearance of a portion of the physical environment.

* * * * *